United States Patent
Pai Brahmavar Pattanshet et al.

(10) Patent No.: US 12,429,349 B2
(45) Date of Patent: Sep. 30, 2025

(54) INTEGRATION OF CONTENT WITHIN NAVIGATION INTERFACE BASED ON CONTEXTUAL DATA

(71) Applicant: Google LLC, Mountain View, CA (US)

(72) Inventors: Puneetha Pai Brahmavar Pattanshet, Brahmavar (IN); Ramprasad Sedouram, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 324 days.

(21) Appl. No.: 18/165,601

(22) Filed: Feb. 7, 2023

(65) Prior Publication Data

US 2024/0263958 A1 Aug. 8, 2024

(51) Int. Cl.
*G01C 21/36* (2006.01)

(52) U.S. Cl.
CPC ..... *G01C 21/3626* (2013.01); *G01C 21/3629* (2013.01); *G01C 21/3694* (2013.01); *G01C 21/3697* (2013.01)

(58) Field of Classification Search
CPC ............ G01C 21/3626; G01C 21/3629; G01C 21/3694; G01C 21/3697; G01C 21/3655; G01C 21/3691; G01C 21/362
See application file for complete search history.

(56) References Cited

U.S. PATENT DOCUMENTS

| | | | |
|---|---|---|---|
| 2005/0091096 A1* | 4/2005 | Coates | G06Q 10/06311 |
| | | | 705/7.26 |
| 2008/0046298 A1* | 2/2008 | Ben-Yehuda | G06Q 10/109 |
| | | | 705/6 |
| 2014/0012498 A1* | 1/2014 | Gustafson | G01C 21/3423 |
| | | | 701/537 |
| 2014/0052675 A1* | 2/2014 | Ko | G06N 5/02 |
| | | | 706/14 |

(Continued)

FOREIGN PATENT DOCUMENTS

EP 2507759 10/2012

OTHER PUBLICATIONS

Hardwick, "Apple Has Internally Tested Injecting Ads into Maps App Search Results. [Updated]", retrieved Apr. 24, 2023, https://www.macrumors.com/2022/08/15/apple-could-bring-ads-to-maps-search/, Aug. 15, 2022, 8 pages.

(Continued)

Primary Examiner — Mary Cheung
(74) Attorney, Agent, or Firm — DORITY & MANNING P.A.

(57) ABSTRACT

Example embodiments of the present disclosure provide for an example method including obtaining data associated with a state of a user device. The example method includes obtaining data associated with navigational context associated with a user device. The example method includes obtaining content slot data indicative of a content slot for displaying a content item via a user device based on a state (Continued)

of the user device and an expected route. The example method includes selecting a content item for the content slot based on the navigational context. The example method includes transmitting data comprising instructions that when executed by the user device cause a content item to be displayed via the content slot.

18 Claims, 17 Drawing Sheets

(56) References Cited

U.S. PATENT DOCUMENTS

| | | | | |
|---|---|---|---|---|
| 2014/0365107 | A1* | 12/2014 | Dutta | G01C 21/343 |
| | | | | 701/538 |
| 2016/0334235 | A1* | 11/2016 | Gustafson | G01C 21/3492 |
| 2017/0083821 | A1* | 3/2017 | Foerster | G06N 5/022 |
| 2019/0295042 | A1* | 9/2019 | Lazar, Jr. | G06Q 10/1095 |
| 2019/0324600 | A1* | 10/2019 | Wipperfürth | G06F 3/0482 |
| 2024/0037511 | A1* | 2/2024 | Noble | G06Q 10/1095 |

OTHER PUBLICATIONS

Keenan, "How to Set Up Google Maps Ads for Beginners.", retrieved Apr. 24, 2023, https://www.shopify.com/retail/google-maps-ads, Apr. 4, 2022, 19 pages.

MDG, "Ads on Maps and Navigation Apps: What Brands Need to Know", retrieved on Apr. 24, 2023, https://www.mdgadvertising.com/marketing-insights/ads-on-maps-and-navigation-apps-what-brands-need-to-know/, 2023, 9 pages.

Samuely, "Are Mobile Ads Within Map Applications A Must-Have Location-Based Strategy?", retrieved Apr. 24, 2023, https://www.marketingdive.com/ex/mobilemarketer/cms/news/advertising/23020.html, 2023, 3 pages.

Spotify, "Targeting on Ad Studio.", retrieved Apr. 24, 2023, https://ads.spotify.com/en-GB/help-center/targeting-options/, Jun. 2020, 4 pages.

* cited by examiner

Database(s) 1500

| User Device State Data 1510 ||
|---|---|
| Category | Value |
| Current Location | X.XXX |
| Past Location | X.XXX |
| Second Location | X.XXX |
| Passenger | TRUE |
| Vehicle Operator | FALSE |

| Calendar Event Data 1540 ||
|---|---|
| Event Category | Value |
| Title | X.XXX |
| Description | X.XXX |
| Location | X.XXX |
| Start Time | XX:XX |
| Duration | X hr Y min |
| Type | X.XXX |

| Expected Route Data 1535 ||
|---|---|
| Category | Value |
| Start Location | X.XXX |
| End Location | X.XXX |
| Estimated Time of Travel | X.XXX |
| Estimated Time of Arrival | X.XXX |
| Traffic Data | X.XXX |

| Traffic Event Data 1545 ||
|---|---|
| Category | Value |
| Recommended Route | X.XXX |
| Obstructions | X.XXX |
| Obstruction Duration | X hr Y min |
| Alternative Routes | X.XXX |
| Traffic Data | X.XXX |

| Content Item Data 1570 |||
|---|---|---|
| Content Item | Physical Location | Time Duration |
| Content Item A | Location A | 0 hr 5 min |
| Content Item B | Location A | 0 hr 30 min |
| Content Item C | Location B | 0 hr 5 min |
| Content Item D | Location B | 1 hr 0 min |
| Content Item E | Location B | 0 hr 30 min |
| Content Item F | Location C | 0 hr 15 min |
| Content Item G | Location C | 0 hr 20 min |
| Content Item H | Location C | 2 hr 0 min |

FIG. 15

INTEGRATION OF CONTENT WITHIN NAVIGATION INTERFACE BASED ON CONTEXTUAL DATA

FIELD

The present disclosure relates generally to integration of content within a navigation interface. More particularly, the present disclosure relates to integrating audio or visual content items within a navigation interface based on contextual data.

BACKGROUND

Navigation interfaces can include one or more interfaces for presenting directions from a first location to a second location.

SUMMARY

Aspects and advantages of embodiments of the present disclosure will be set forth in part in the following description, or can be learned from the description, or can be learned through practice of the embodiments.

In one example aspect, the present disclosure provides for an example system for integration of content within a navigation interface based on contextual data including one or more processors and one or more memory device storing instructions that are executable to cause the one or more processors to perform operations. In some implementations, the one or more memory devices can include one or more transitory or non-transitory computer-readable media storing instructions that are executable to cause the one or more processors to perform operations. In the example system, the operations can include obtaining, by the computing system, data associated with navigational context associated with a user device, wherein the navigational context comprises an expected route and at least one of (i) an event associated with a calendar application of a user device or (ii) a predicted traffic event. In the example system, the operations can include obtaining, by the computing system, content slot data indicative of a content slot for providing for display a content item via a user interface of the user device based on the state of the user device and the expected route. In the example system, the operations can include selecting, by the computing system, a content item for the content slot based on the navigational context. In the example system, the operations can include transmitting, by the computing system, data comprising instructions that when executed by the user device cause a content item to be provided for display via the content slot.

In some embodiments of the example system, the operations include obtaining data indicative of a first time duration associated with a first content item and a second time duration associated with a second content item. In some embodiments of the example system, the operations include determining, based on the calendar application of the user device, that a user has an availability window of a third time duration. In some embodiments of the example system, the operations include comparing the third time duration to the first time duration and the second time duration. In some embodiments of the example system, the operations include selecting the content item based on the first time duration, second time duration, and third time duration.

In some embodiments of the example system, the operations include obtaining data indicative of a first time duration associated with a first content item and a second time duration associated with a second content item. In some embodiments of the example system, the operations include determining, based on the predicted traffic event, that a user has an availability window of a third time duration. In some embodiments of the example system, the operations include comparing the third time duration to the first time duration and the second time duration. In some embodiments of the example system, the operations can include selecting the content item based on the first time duration, second time duration, and third time duration.

In some embodiments of the example system, the predicted traffic event comprises at least one of (i) occurrence of a car accident, (ii) an indication of traffic movement below a threshold speed, (iii) an expected time to resolve a traffic instance, or (iv) an expected increase in traffic.

In some embodiments of the example system, the event associated with the calendar application of the user device comprises at least one of (i) an event start time, (ii) an event location, or (iii) an event description.

In some embodiments of the example system, the content item for the content slot is selected based on at least one of (i) the event associated with the calendar of the application, (ii) a time to get to the location of the event, (iii) expected traffic to get to the location of the event, (iv) time to arrive at activity associated with the content item, or (v) time to complete the activity associated with the content item.

In some embodiments of the example system, the content slot for presenting the content item to the user is determined using a machine-learned model.

In some embodiments of the example system, the operations can include obtaining data indicative of user interaction with one or more content items. In some embodiments of the example system, the operations can include obtaining data indicative of a user performing one or more target actions. In some embodiments of the example system, the operations can include updating the machine-learned model based on the data indicative of the user interaction with the one or more content items and the data indicative of the user performing one or more target actions.

In some embodiments of the example system, the selected content item comprises an audio content item.

In an example aspect, the present disclosure provides for an example computer-implemented method. The example method includes obtaining, by the computing system, data associated with a state of a user device, wherein the state of the user device comprises at least one of (i) a location of a user device or (ii) a transit type. The example method includes obtaining, by the computing system, data associated with navigational context associated with a user device, wherein the navigational context comprises an expected route and at least one of (i) an event associated with a calendar application of a user device or (ii) a predicted traffic event. The example method includes obtaining, by the computing system, content slot data indicative of a content slot for providing for display a content item via a user interface of the user device based on the state of the user device and the expected route. The example method includes selecting, by the computing system, a content item for the content slot based on the navigational context. The example method includes transmitting, by the computing system, data comprising instructions that when executed by the user device cause a content item to be provided for display via the content slot.

In some embodiments of the example method, the location of the user device comprises a current location of the user device.

In some embodiments of the example method, the transit type comprises at least one of (i) passenger or (ii) operator.

In some embodiments of the example method, the transit type of the user device is determined based on at least one of (i) determining the user is traveling along a public transit route or (ii) obtaining user input indicative of the transit type.

In some embodiments of the example method, the expected route comprises at least one of (i) a route recommended by a navigation application, (ii) a frequently traveled route associated with transit of the user device between two locations, (iii) a recommended route that aligns with one or more user preferences, or (iv) a route that aligns with a public transit route.

In some embodiments of the example method, the navigational context further comprises a complexity of an associated stage of navigation which is determined based on expected route maneuvers.

In some embodiments of the example method, the expected route maneuvers comprise at least one of (i) a turn, (ii) a lane change, (iii), a pedestrian crossing, (iv) a speed limit change, or (v) a straight stretch of travel.

In some embodiments of the example method, the complexity of an associated stage of navigation is determined based on a navigational state, wherein the navigational state comprises at least one of (i) static navigational state or (ii) dynamic navigational state.

In some embodiments of the example method, the static navigational state comprises a state wherein the user device is directed to continue straight for a distance above a threshold distance, wherein the threshold distance is based on a speed limit and a geographic area.

In some embodiments of the example method, the dynamic navigational state comprises a state wherein the user device is directed to perform an expected route maneuver within a threshold distance.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining, by a computing system, data associated with a state of a user device, wherein the state of the user device comprises at least one of (i) a location of a user device or (ii) a transit type. In the example transitory or non-transitory computer readable medium, the operations include obtaining, by the computing system, data associated with navigational context associated with a user device, wherein the navigational context comprises an expected route and at least one of (i) an event associated with a calendar application of a user device or (ii) a predicted traffic event. In the example transitory or non-transitory computer readable medium, the operations include obtaining, by the computing system, content slot data indicative of a content slot for providing for display a content item to via a user interface of the user device based on the state of the user device and the expected route. In the example transitory or non-transitory computer readable medium, the operations include selecting, by the computing system, a content item for the content slot based on the navigational context. In the example transitory or non-transitory computer readable medium, the operations include transmitting, by the computing system, data comprising instructions that when executed by the user device cause a content item to be provided for display via the content slot.

BRIEF DESCRIPTION OF THE DRAWINGS

Detailed discussion of embodiments directed to one of ordinary skill in the art is set forth in the specification, which makes reference to the appended figures, in which:

FIG. 15 depicts a block diagram of example user databases according to example embodiments of the present disclosure.

DETAILED DESCRIPTION

Figure 1:
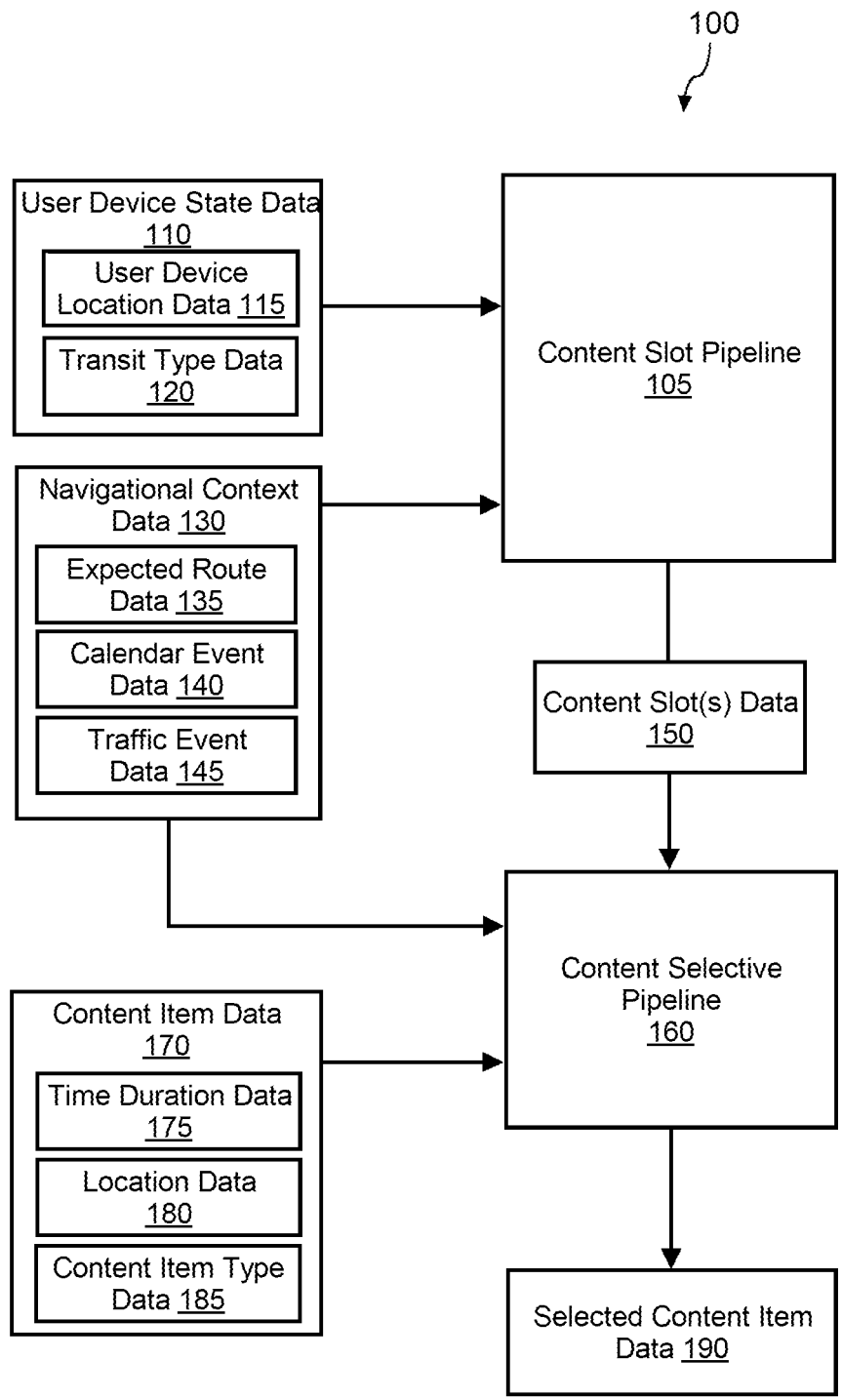
FIG. 1 depicts a flow chart diagram of example data flow according to example embodiments of the present disclosure.

Generally, the present disclosure is directed to using navigational context data to select content items for presentation by a user device and to determine when and how they are presented. Content items can be selected based on a route associated with the user device (e.g., based on nearby attractions, locations, etc.). Timing data indicating when to present the content item (e.g., as the route is traversed) can be determined based on context data associated with the route. Timing data can be configured to improve a user's opportunity to engage with and respond to the presented content. A presentation modality can also be selected based on route context data so that the user device output seamlessly integrates with the user's travel activity on the route.

Current methods provide for content display based on a current location of a user device but do not take into account complexities associated with a user's direction of travel, expected complexity of various portions along a user's route, the context of the user's calendar availability, current traffic events, and the like. For instance, if a user has passed a location, they are unlikely to respond to a content item associated with the location by stopping or turning around to visit the location. Naive proximity-based recommendations can thus waste resources by rendering useless content.

Advantageously, example implementations of the present disclosure can use route context data to select more relevant content items for presentation by a user device and to determine improved timing and modality of the presentation. These points can be determined based on a user's start location, a user's end location (or expected end location), whether the user is a passenger (e.g., using public transportation, riding in a friend's car) or a driver (e.g., driving a motorized vehicle, operating a non-motorized vehicle), and the complexity of various portions of the expected route. For instance, portions of a route may vary in complexity due to being a straight way for a number of miles or kilometers, an area requiring a lane change, turn, multiple traffic signals, changes in speed limit, and the like. The computing system can determine a time during the route to render the content item and allow for more relevant content to be displayed to a user at the desired time. For instance, if a user is given ample notice of an upcoming location associated with a content item, they may have the ability to stop at that location in response to the delivery of a content item via a device associated with the user.

In some implementations, the computing system can determine whether to serve an audio or visual content item based at least in part on a state of the user device or a state of the navigation. For instance, if a user device is determined to be associated with a passenger designation, an audio or visual content item can be appropriate. If a user device is determined to be associated with a vehicle operator, the computing system may determine that, when the vehicle is in motion, an audio content item is appropriate. Additionally or alternatively, the computing system can determine that when the vehicle is in motion in a low-complexity portion of the route, an audio content item can be provided for display to the user via an interface of the user device.

In some embodiments, the computing system can determine a content item to provide for display based on an expected availability time and a time duration associated with the content item. For instance, the computing system can determine an expected availability time duration associated with a user. For instance, an expected availability time can be associated with an availability window in a calendar application (e.g., a window of time that a calendar application does not contain a calendar event). Additionally, or alternatively, an expected availability time can be associated with a traffic event (e.g., a car accident or traffic obstruction that will not be cleared for an hour and causing traffic build-up). By way of example, the computing system can determine a time duration associated with a content item. The time duration can be associated with an expected activity time, travel time to a location associated with the content item, and the like.

The present disclosure provides for a technical solution to this technical problem by providing an improved human-machine interface that assists the user to execute tasks using and based on presented content items. For instance, by determining the role of the user associated with the user device in the navigation, the type of content item can be altered to integrate with the user's current activity and determine appropriate times to create slots for content to be displayed via a user device. In this manner, example interfaces provided by aspects of the present disclosure can aid the user's ability to engage with and control computing devices.

Additionally, computing resources can be saved by preventing the display of a content item that may be overridden by navigation instructions (and thus, not observed by an end user). Computing resources can be saved by preventing the display of a content item that provides unnecessary information to a user when it would be too late to be used by the user or when the user would be otherwise focused on travel activity (e.g., changing trains, purchasing tickets, etc.). Computing resources can be saved by preventing the transmission of content items to a user that facilitate actions that the user is not presently able to perform. Additionally, the computing system can obtain data associated with a user response to various content item displays (e.g., continuing along the expected route, taking a detour that aligns with the subject matter of the content item, taking a detour that does not align with the subject matter of the content item, and the like). Thus, the computing system can update a model (e.g., a machine-learned model) based on data indicative of performance of past displayed content items to improve the utilization of computing resources and bandwidth in future instances. Additionally, the computing system can update a model (e.g., a machine learned model) based on data indicative of a time duration associated with a content item.

The improvements associated with the systems and methods discussed herein can be further understood with reference to the figures.

FIG. 1 depicts a block diagram of example data flow according to example embodiments of the present disclosure. For instance a content slot pipeline 105 can obtain user device state data 110 and navigational context data 130 as input. Content slot pipeline 105 can generate content slot data 150 as output. Content selection pipeline 160 can obtain navigational context data 130, content slot data 150, or content item data 170 as input. Content selection pipeline 160 can generate selected content item data 190 as output. Data as described in FIG. 1 can be stored in one or more databases (e.g., database(s) 1500 depicted in FIG. 15).

User device state data 110 can include user device location data 115 or transit type data 120. User device location data 115 can include current location data, past location data, or second location data. Transit type data 120 can include passenger data or vehicle operator data (e.g., indicating the transit type of the user associated with user the device).

Navigational context data 130 can include expected route data 135, calendar event data 140, or traffic event data 145. Expected route data 135 can include start location data, end location data, estimated time of travel data, estimated time of arrival data, traffic data, or other expected route related data. Calendar event data 140 can include title data, description data, location data, start time data, duration data, type data, or other calendar event related data. Traffic event data 145 can include recommended route data, obstructions data, obstructions duration data, alternative routes data, traffic data, or other traffic event related data.

Content item data 170 can include time duration data 175, location data 180, or content item type data 185. Content item data 170 can include data associated with a plurality of content items. For instance, each content item can include content item identifier data, location data 180, and time duration data 175. Content item identifier data can be used to identify a respective content item. Location data 180 can include data associated with a physical location associated with the content item. For instance, a physical location can be associated with a brick-and-mortar location, a street address, latitude and longitude coordinates, GPS coordinates, or any other location data.

Time duration data 175 can include a time duration associated with the content item. For instance, a content item can include a coupon for an amusement park, an image of food item available at a location, or some other content that has an associated time with completing the activity associated with the content item. For example, the time to completion can include the time to ride a certain number of rides at an amusement park, the time to visit a restaurant and order or consume a food item, or some other expected time duration for completion. In some implementations the expected time duration for completion can include the time it would take for a user to travel from a start location to the physical location and then travel from the physical location to a second location. A second location can include, for example, an end location associated with a navigation instance, an expected end location based on context data, or a location associated with an upcoming calendar event.

Content slot pipeline 105 can include a content slot model. Content slot model can obtain user device state data 110 or navigational context data 130 and generate one or more content slots and associated content slot data 150. In some implementations, content slot model can be a machine-learned model. Content slot model can generate one or more content slots according to example embodiments described herein.

Content selection pipeline 160 can include a content selection model. Content selection model can obtain navigational context data 130, content slot data 150, or content item data 170 as input and generate one or more selected content items and associated selected content item data 190. In some implementations, content selection model can be a machine-learned model. Content selection model can select one or more content items according to example embodiments described herein.

The selected content item data 190 can be transmitted to a user device. For instance, the user device can obtain the selected content item data 190. Content item data 190 can include instructions that when executed cause the user device to present the content item for display via an interface of the user device (e.g., an image on a screen in a navigation application, an audio message in a navigation application, or an audio message incorporated into music playing in a song or radio application).

By way of example, a user device can be playing music (e.g., through a speaker). The computing system can generate one or more content items or select one or more content items that seamlessly integrate with the music being played by the user device. For instance, the content item can be the same tune as the music. In some implementations the content item can be generated for the particular song being played. In some implementations, the content item is generated based on content item data and song data (e.g., to generate a customized or bespoke content item experience for a particular portion of the song during the particular content slot).

Figure 2:
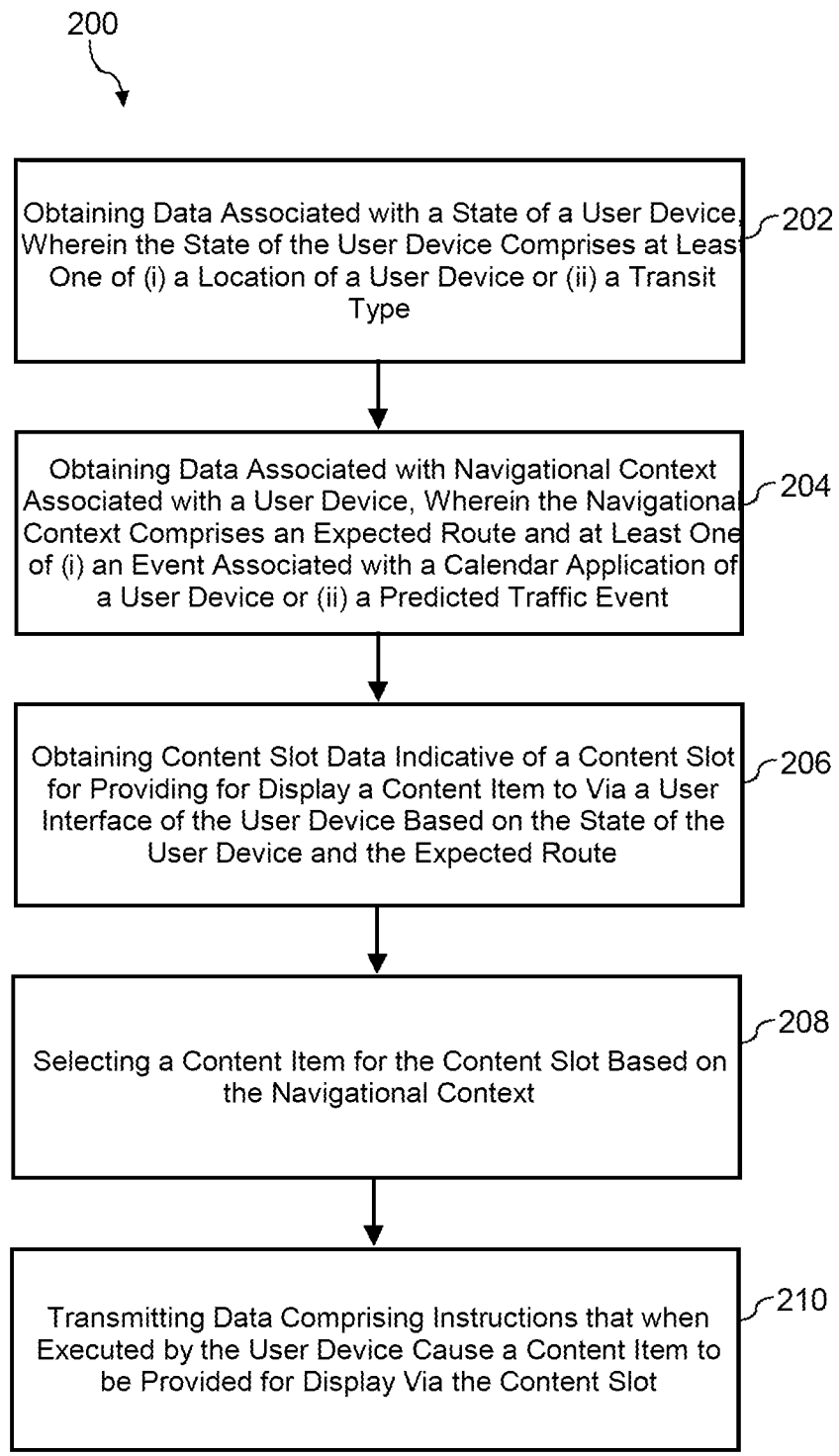
FIG. 2 depicts a flow chart diagram of an example method to perform integration of content within a navigation interface based on contextual data according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of method 200 can be omitted, rearranged, combined, or adapted in various ways without deviating from the scope of the present disclosure.

At (202), method 200 can include obtaining data associated with a state of a user device, wherein the state of the user device comprises at least one of (i) a location of a user device or (ii) a transit type. For instance, a computing system can obtain data associated with a state of a user device, wherein the state of the user device comprises at least one of (i) a location of a user device or (ii) a transit type. As described herein, the location of the user device can include a current location of a user device. For instance, a current location of a user device can be determined using geographic location can be associated with a brick-and-mortar location, a street address, latitude and longitude coordinates, global position system (GPS) data, Wi-Fi data, mobile network data, device sensor data, Bluetooth data, user input, or any other location data.

As described herein, the transit type can include at least one of (i) passenger or (ii) operator. For instance, passenger transit type can be associated with a user device that is being used by a passenger of a vehicle. For instance, operator transit type can be associated with a user device that is being used by an operator of a vehicle.

In some implementations, the transit type of the user device is determined based on (i) determining the user is traveling along a public transit route or (ii) obtaining user input indicative of the transit type. For instance, the computing system can obtain data comprising a plurality of GPS pings associated with a user device location. The computing system can compare the GPS ping pattern to a known public transit route. In response to the GPS pings associated with a user device location being within a threshold of similarity to the known public transit route, the computing system can determine that the user is on a public transit route. In response to determining that the user is on a public transit route, the computing system can determine that the transit type is passenger transit type.

In some implementations, the computing system can obtain data comprising user input indicative of the transit type. For example, the computing system can cause an interactive element to be provided for display via a user device (e.g., a visual or audio interactive element). The interactive element can include a message asking for the user to provide input indicative of the user's transit type. The system can obtain data including user input indicative of a selection of transit type. For instance, the user can select an element labeled "passenger" or "operator." Additionally, or alternatively, the user can provide audio input. For instance the user can say, "I am operating the car" or "I am a passenger of the vehicle." The computing system can perform natural language processing to interpret the audio user input. In response, the computing system can determine a transit type of the user.

A device state can include an initiation of a navigation instance via a navigation interface. For instance, a navigation interface can be associated with a navigation application (e.g., map application). An example navigation instance is depicted in FIG. 3.

Figure 3:
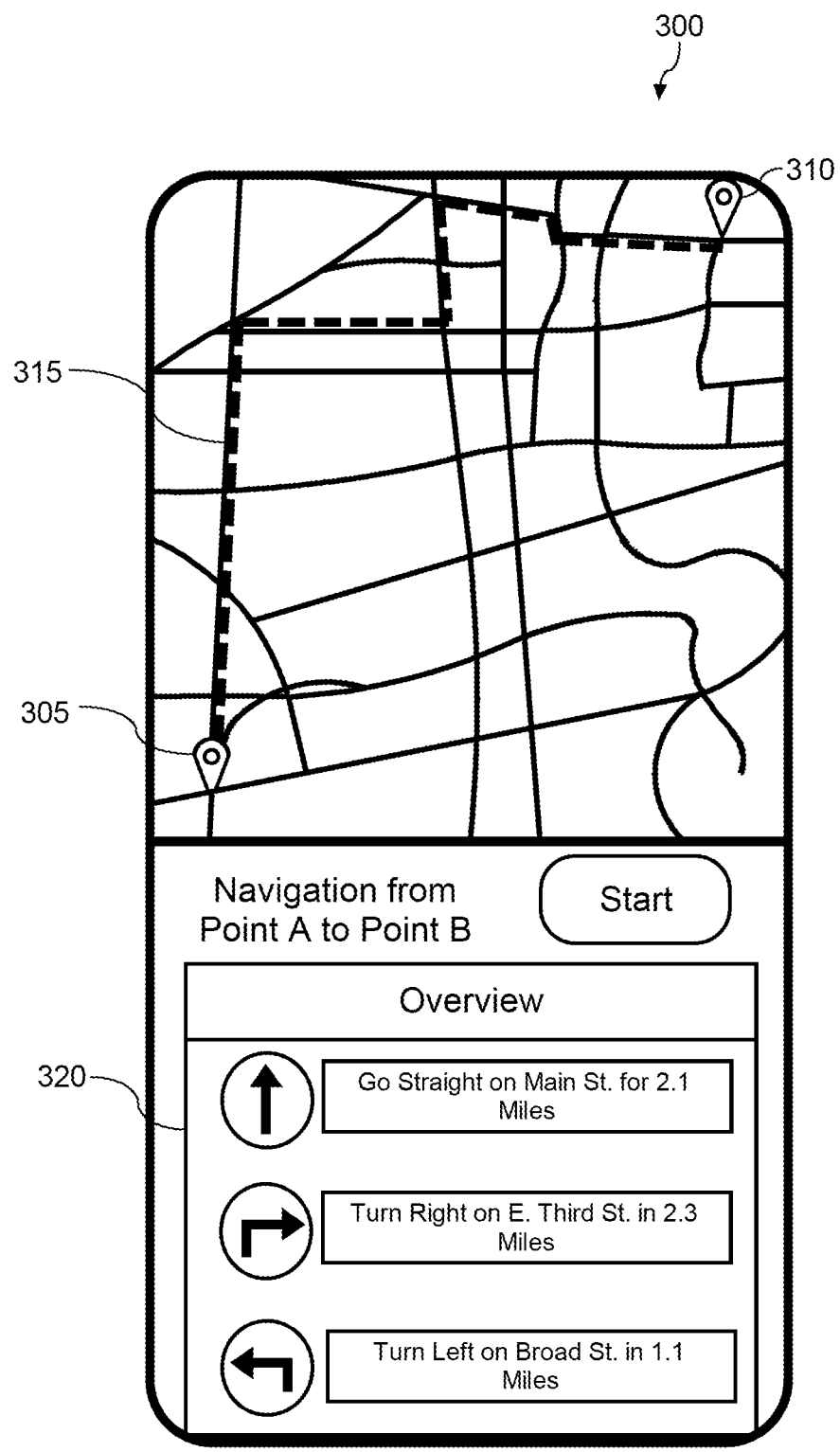
FIG. 3 depicts an example user interface according to example embodiments of the present disclosure.

FIG. 3 depicts an example user interface 300 containing a navigation interface (e.g., associated with a map application or navigation application). User interface 300 can include a start location 305 and end location 310. User interface 300 can include a suggested path 315. User interface 300 can include a navigation window 320.

User interface 300 can depict an example geographic location (e.g., geographic area 600) associated with a start location 305 and end location 310 associated with a user device's expected travel. Geographic location can include a plurality of physical locations with a plurality of offerings. For example, offerings can include entertainment, dining, shopping, services, and the like. The plurality of physical locations can have associated content items that relate to the plurality of offerings (e.g., informational graphics, coupons, advertisements, and the like).

Navigation window 320 can include an overview of directions for a user to travel from start location 305 to end location 310. In some implementations, navigation window 320 can be resized by the system to become smaller. Additionally or alternatively, navigation window 320 can be updated to display directions in real-time.

A navigation interface can be associated with a geographic area. Example geographic areas are discussed further with regard to FIG. 6-FIG. 9 and FIG. 12.

FIG. 6-FIG. 9 depict example geographic area 600 comprising a start location 605, end location 610, and recommended route 615. The geographic area 600 can include a first physical location 620, a second physical location 625, and a third physical location 630. Each of the respective physical location can have one or more associated content items that are associated with one or more activities. Each respective physical location can be associated with an updated route recommendation and a content item time duration.

Figure 7:
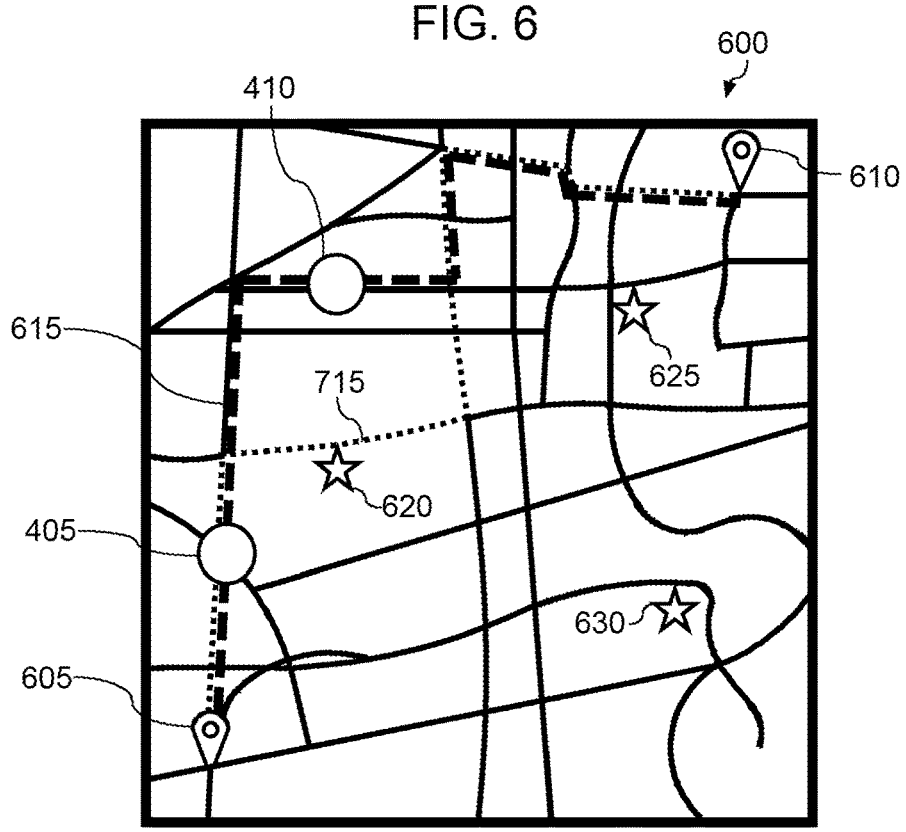
FIG. 7 depicts an example geographic area according to example embodiments of the present disclosure.

FIG. 7 depicts example geographic area 600 including updated route 715 associated with a rerouting to first physical location 620.

Figure 8:
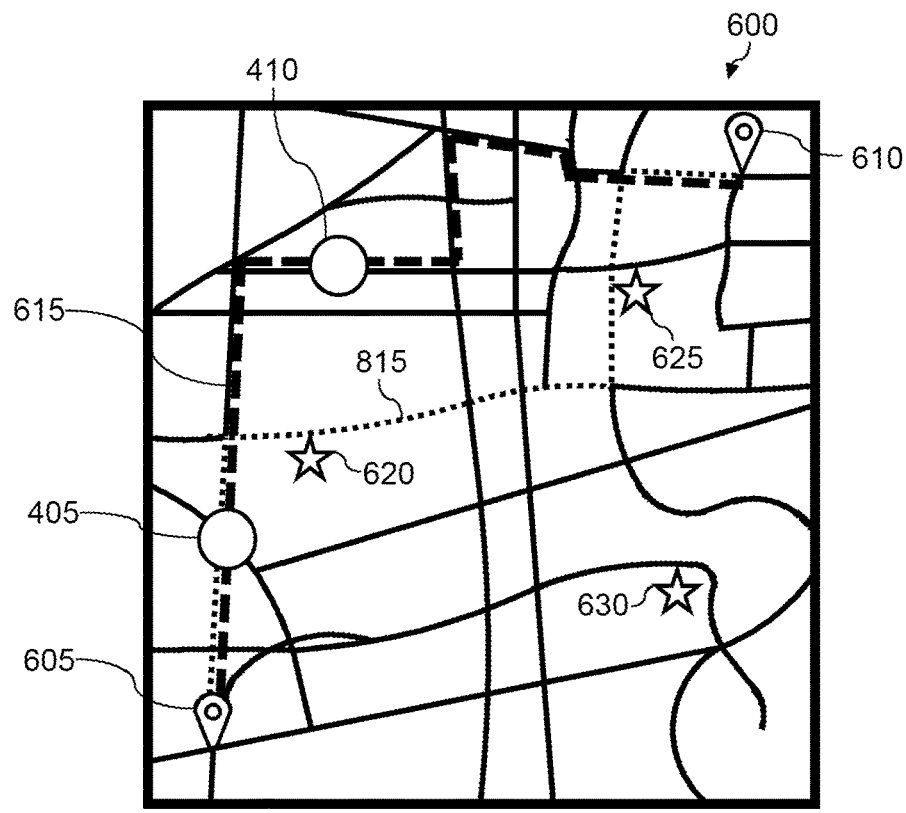
FIG. 8 depicts an example geographic area according to example embodiments of the present disclosure.

FIG. 8 depicts example geographic area 600 including updated route 815 associated with a rerouting to second physical location 625.

Figure 9:
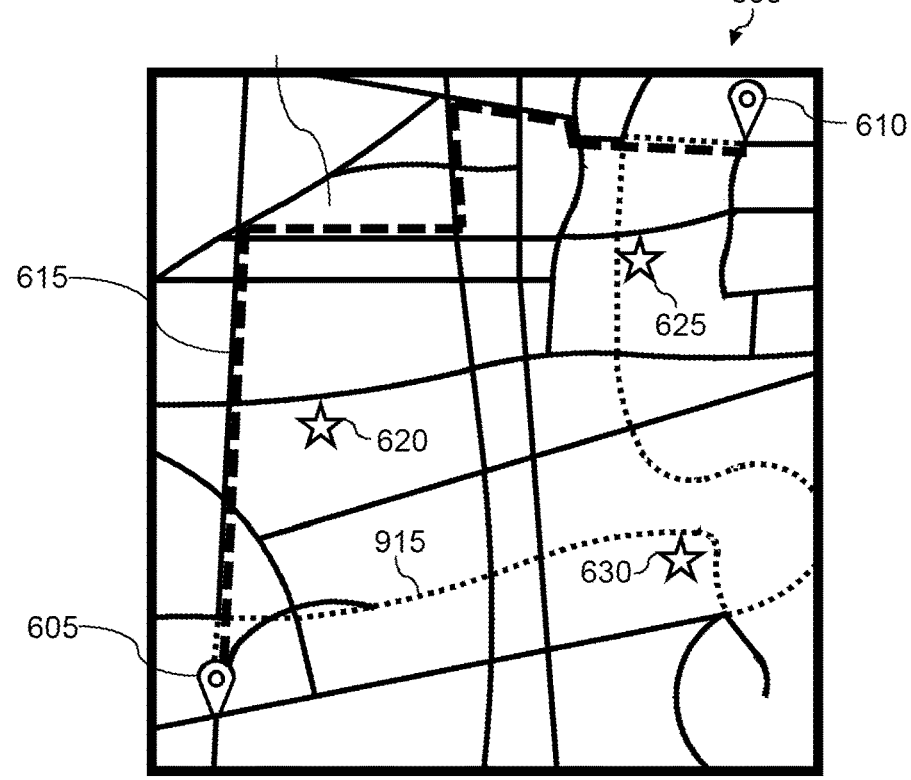
FIG. 9 depicts an example geographic area according to example embodiments of the present disclosure.

FIG. 9 example geographic area 600 including updated route 915 associated with a rerouting to third physical location 630.

Figure 12:
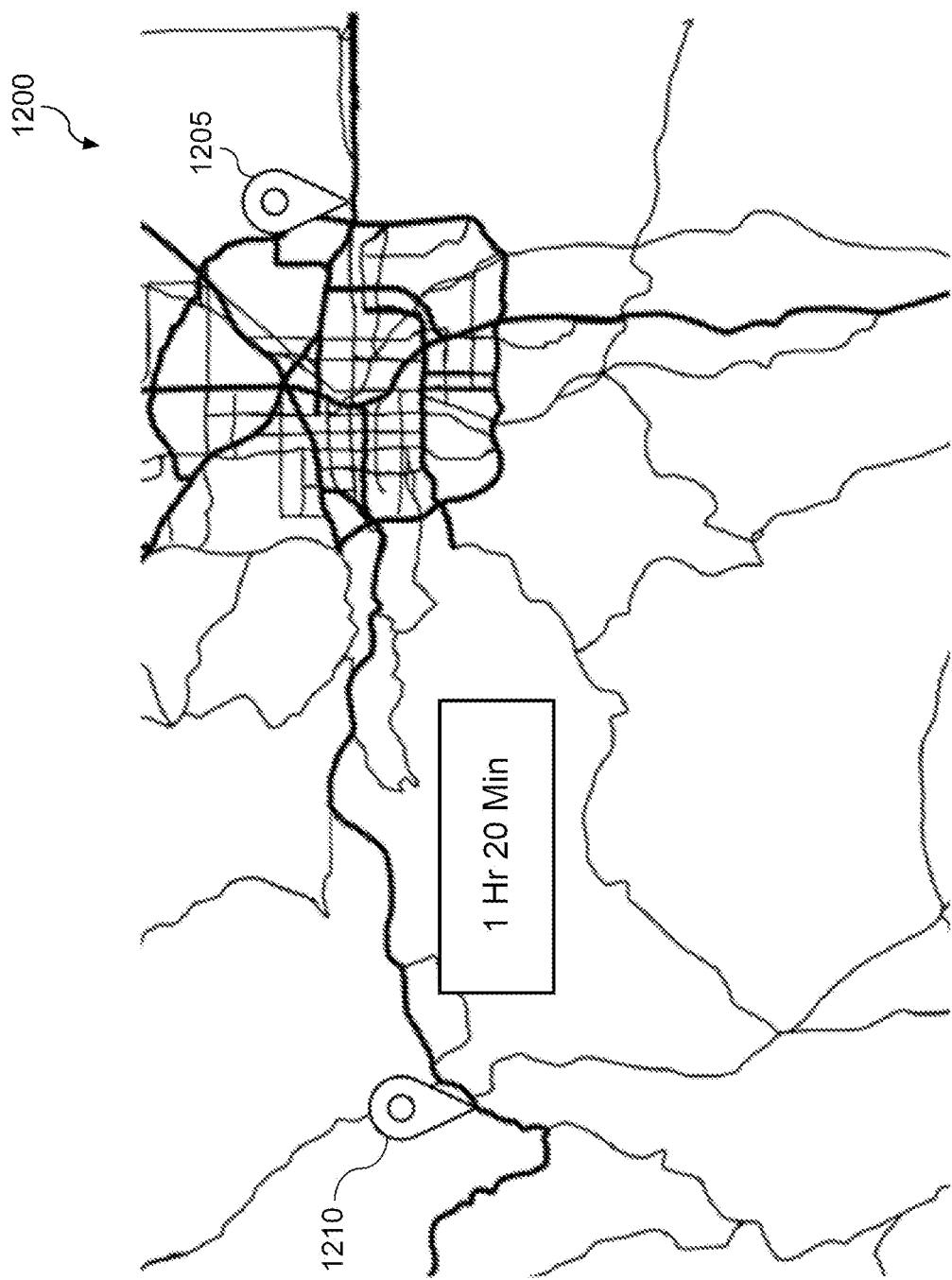
FIG. 12 depicts an example geographic area according to example embodiments of the present disclosure.

Additionally, or alternatively, FIG. 12 depicts example geographic area 1200. Geographic area 1200 can be associated with transit from first location 1205 to second location 1210. By way of example, first location 1205 can be associated with a more densely populated area (e.g., an urban area) and second location 1210 can be associated with a less densely populated area (e.g., a rural area). An implementation of the present disclosure can include an implementation related to an availability time duration associated with a traffic event. For instance, the computing system can determine that under normal traffic conditions, the time to travel from first location 1205 to second location 1210 is 1 hour and 20 minutes.

By way of example, a current time can be 10:00 AM. Under normal circumstances the time to travel from first location 1205 to second location 1210 can be 1 hour and 20 minutes. Thus, leaving at 10:00 AM an estimated time of arrival would be 11:20 AM.

In some instances, however, events can occur that alter traffic patterns. For instance, a car accident can occur, a large influx of individuals into a geographic location associated with an event, normal traffic patterns associated with commute times to work, or other traffic related phenomena.

At (204), method 200 can include obtaining data associated with navigational context associated with a user device, wherein the navigational context can include an expected route and at least one of (i) an event associated with a calendar application of a user device or (ii) a predicted traffic event. For instance, the computing system can obtain data associated with navigational context associated with a user device, wherein the navigational context comprises an expected route and at least one of (i) an event associated with a calendar application of a user device or (ii) a predicted traffic event. As described herein, an expected route can include at least one of (i) a route recommended by a navigation application, (ii) a frequently traveled route associated with transit of the user device between two locations, (iii) a recommended route that aligns with one or more user preferences, or (iv) a route that aligns with a public transit route.

By way of example the expected route can include a route recommended by a navigation application. In some implementations, a route recommended by a navigation application can include one or more routes recommended from a start location (e.g., location 305) to an end location (e.g., location 310). In some implementations, the computing system can provide a single recommended route. Additionally, or alternatively, the computing system can provide a plurality of recommended routes (e.g., for a user to select).

By way of example, the expected route can include a frequently traveled route associated with the transit of the user device between two locations. In some implementations a frequently traveled route associated with transit of the user device between two locations can be a route that the computing system determines is frequently traveled by the user. By way of example, the computing system can determine that a start location is associated with a home location and an end location is associated with a grocery store. The computing system can analyze device location history to determine that the user device often travels from start location to end location on Sundays between 3:00 PM and 10:00 PM. The computing system can determine that the user takes the same route when traveling from start location to end location. As described herein start location and end location can be any locations. In some implementations the start location or end location can be associated with a current location of a user device. In some implementations the start location or end location can be associated with a frequently visited location (e.g., determined based on determining a frequency of location pings at the same location).

By way of example, the expected route can include a recommended route that aligns with one or more user preferences. For instance, user device data can indicate that a user device avoids traveling on interstates or highways. In response, the computing system can recommend routes that avoid interstates or highways.

By way of example, the expected route can include a route that aligns with a public transit route. For instance, a public transit route can be associated with a bus system, metro, subway, or any other form of public transit. In some implementations, a user can utilize a navigation application that combines a plurality of modes of transportation (e.g., public transportation, walking, biking, scooter, electric vehicle, aerial vehicle, watercraft, etc.).

In some embodiments, the event associated with the calendar application of the user device can include at least one of (i) an event start time, (ii) an event location, (iii) an event description, or (iv) an event type. For instance, an event start time can be a time input by a user into a calendar application indicative of when an event will begin. The event location can include a geographic location or colloquial location. For instance a user can input a street address, coordinates, or similar location data. Additionally, or alternatively, a user can indicate the location is a colloquial location such as home, work, school, Mary's home, or some similar indication. The computing system can utilize context data to determine a geographic location associated with a colloquial location. Additionally, or alternatively, the computing system can provide a prompt for a user to provide additional data regarding the colloquial location (e.g., a street address). An event description can include a description of the event. For instance, the description can include what the event will entail, whether the event is a personal event or work event, additional information about the event, event invitees, and the like. The event description can be processed to determine an event type. Additionally, or alternatively, a user can provide direct input indicative of an event type. For instance an event type can be a birthday party, work meeting, social gathering, wedding, dinner, vacation, or any other event type.

Figure 5:
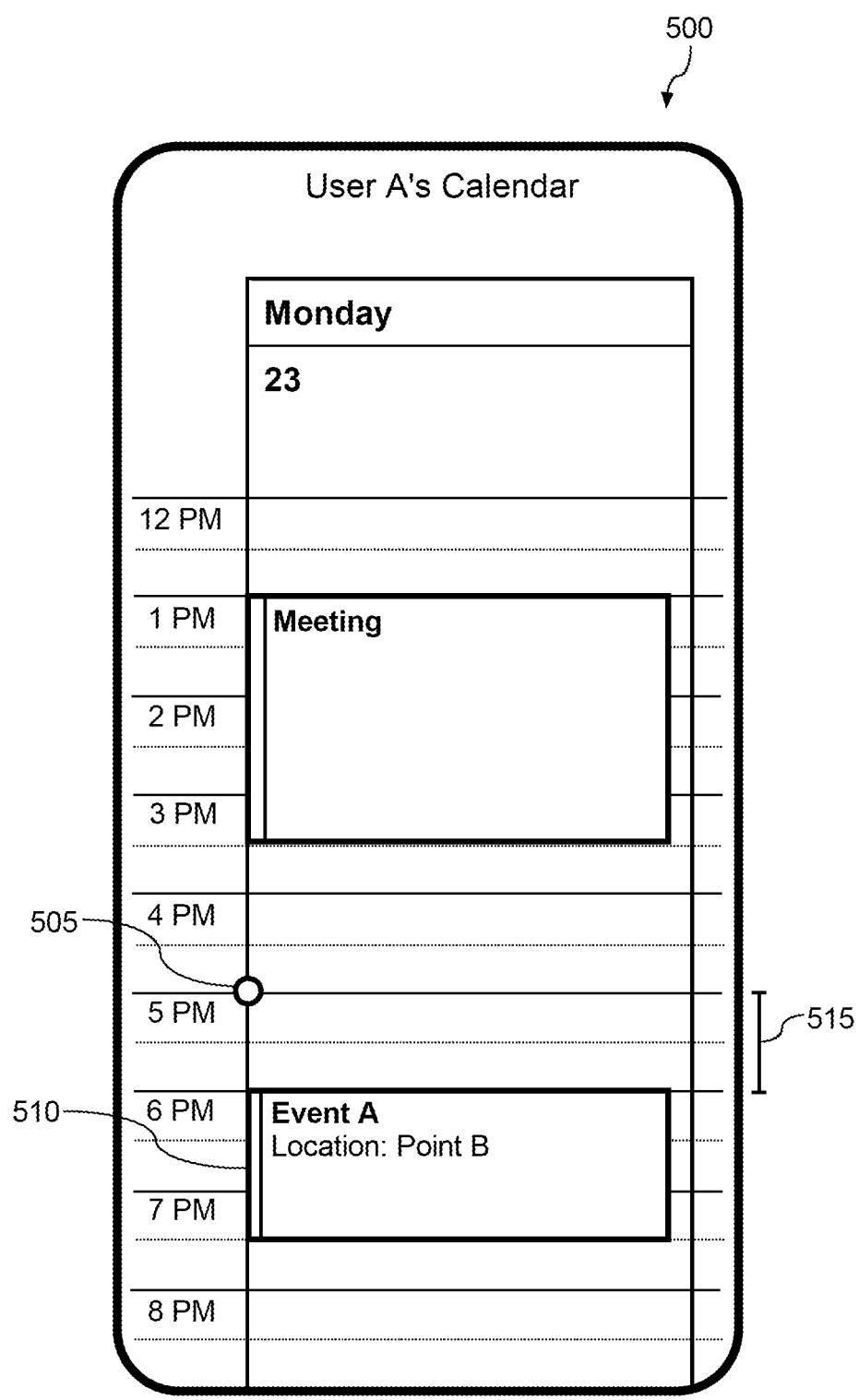
FIG. 5 depicts an example user interface according to example embodiments of the present disclosure.
Figure 6:
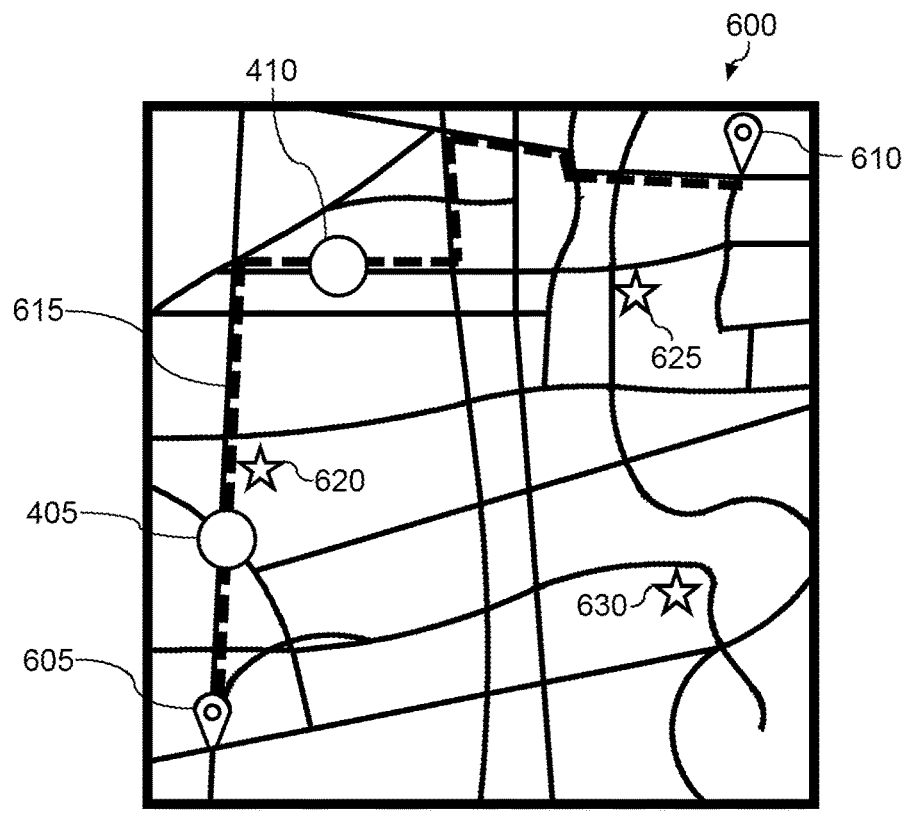
FIG. 6 depicts an example geographic area according to example embodiments of the present disclosure.

An example user interface associated with a calendar interface is depicted in FIG. 5. FIG. 5 depicts example user interface 500 displaying an interface associated with a calendar application. User interface 500 can include a current time 505, event A 510, and an availability window 515.

As depicted in FIG. 5, user interface 500 can include one or more events associated with a user. The difference in time between the current time 505 and a user's next event (e.g., event A 510), can be indicative of an availability window 515. Availability window 515 can be a time duration between a current time and a time at which a user must be at a particular location. In some implementations, event A 510 can include associated data. For instance, associated data can include an event name, event description, event location, or event duration. In some implementations, the location associated with event A 510 can be the same as end location (e.g., end location 310) associated with a navigation application instance.

Additionally, or alternatively, the computing system can determine an available time duration based on one or more traffic events. By way of example, the predicted traffic event can include at least one of (i) occurrence of a car accident, (ii) an indication of traffic movement below a threshold speed, (iii) an expected time to resolve a traffic instance, or (iv) an expected increase in traffic. For instance, the computing system can obtain data indicative of one or more traffic events from a first party or third party device. For instance, a user can provide input indicative of the occurrence of a traffic event (e.g., via a user interface of a user device) and the computing system can validate the occurrence of the traffic event and share the traffic event with one or more additional user devices. In some implementations, the predicted traffic event can be associated with one or more obstructions to a transit path (e.g., road, metro/train tracks). For instance, a traffic event can include a car accident. By way of example the car accident can result in a complete shut-down of a roadway until the car accident is cleared.

In some implementations, the traffic event can include an indication of traffic movement below a threshold speed. For instance, a threshold speed can be determined based on historical patterns of average speed with a particular location. Additionally, or alternatively, a threshold speed can be determined based on a speed limit of a particular location.

In some implementations, the traffic event can include an expected time to resolve a traffic instance. For example, a car accident in a location of a known severity can be associated with an average clearance time of X minutes. The resolution time can be estimated based on historical data or user input indicative of an expected time for resolution. For instance, a department of motor vehicles user can provide input indicative of an expected time for resolution.

In some implementations, the traffic event can include an expected increase in traffic. For instance, the expected increase in traffic can be associated with historical or predicted traffic patterns. For instance, an expected increase in traffic can be associated with rush hour traffic. Rush hour traffic can be associated with normal commute times to or from work or with popular travel times (e.g., weekends, holidays).

Figure 13:
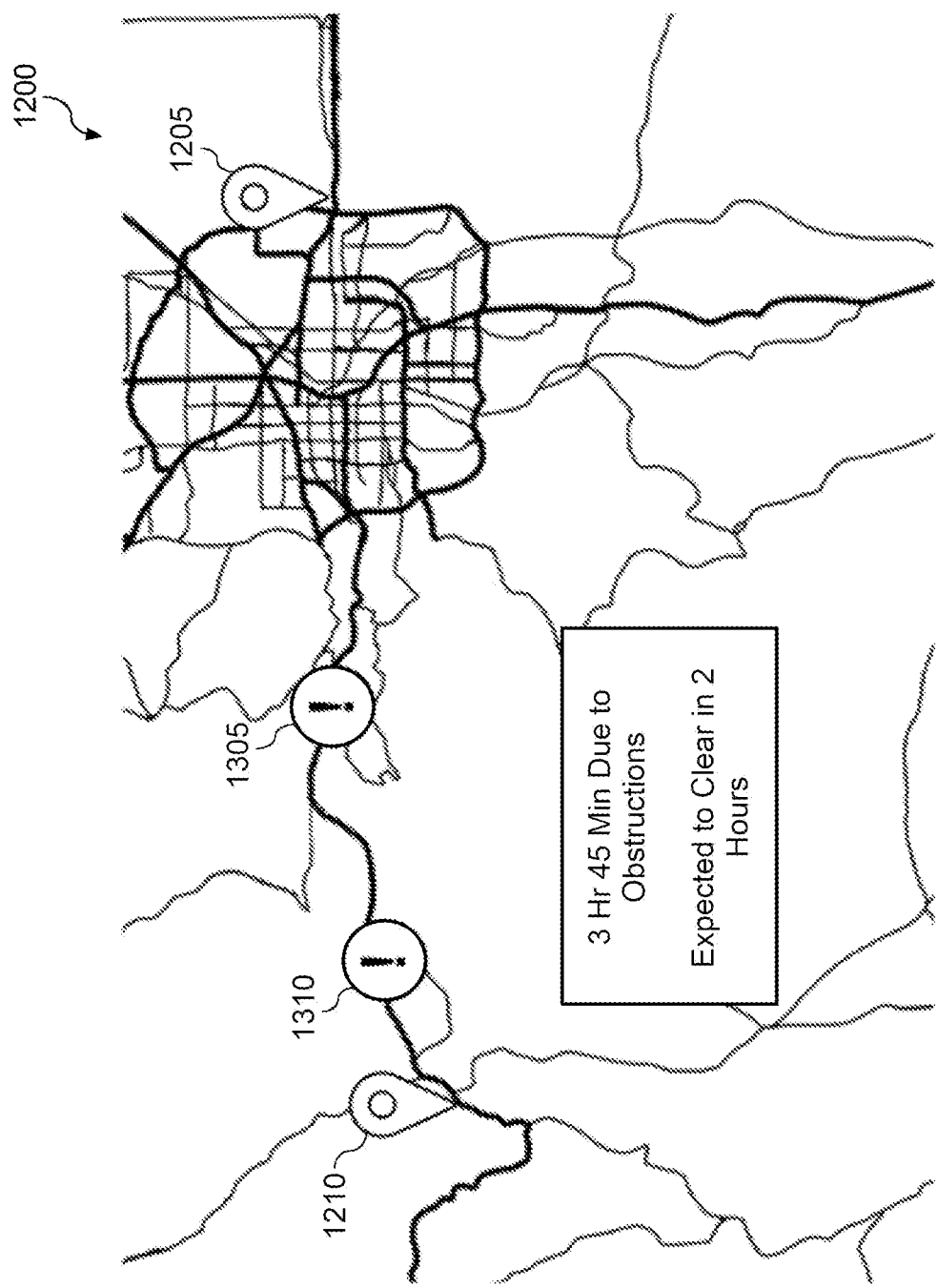
FIG. 13 depicts an example geographic area according to example embodiments of the present disclosure.

An example geographic area including one or more traffic events is depicted in FIG. 13. As depicted in FIG. 13, there can be a plurality of traffic events. For example the one or more traffic events can include first obstruction 1305 and second obstruction 1310. Based on an analysis of historical data and context data, the computing system can determine an updated estimated time of travel from first location 1205 to second location 1210. For instance, first obstruction 1305 and second obstruction 1310 can be car accidents. The car accidents can be associated with an increased expected travel time from a standard time of 1 hour and 20 minutes to an expected 3 hours and 45 minutes with an expectation that the car accidents should be cleared, and the estimated time of travel should return to the normal 1 hour and 20 minutes after 2 hours.

By way of example, a current time can be 10:00 AM. Under the conditions depicted in FIG. 13, the estimated time of travel from first location 1205 to second location 1210 can be 2 hours and 45 minutes due to obstructions (e.g., car accidents). Thus, if a user were to leave and travel from first location 1205 to second location 1210 the estimated time of arrival would be 1:45 PM. The computing system can obtain the estimated time of arrival of 1:45 PM and an expected obstruction clearance time of 2:00 hours to determine one or more content items associated with redirecting the user to avoid wasted time sitting in traffic.

For instance, the computing system can determine one or more relevant content items associated with one or more physical locations to provide for display via a user device. For instance, the content items can include one or more interactive elements. Upon receipt of data indicative of a user selecting an interactive element of a content item, the computing system can automatically initiate a navigation instance. The navigation instance can include a navigation to a physical location associated with the content item being provided for display via a navigation interface of the user device. In some implementations, interaction with a content item can result in the user device providing for display a content item in an interface outside of the navigation interface to provide additional information related to the content item (e.g., a link to a website, launching an application). Additionally, or alternatively, interaction with the content item can result in the user device providing for display further information related to the content item within the navigation interface.

At (206), method 200 can include obtaining content slot data indicative of a content slot for providing for display a content item via a user interface of the user device based on the state of the user device and the expected route. For instance, the computing system can obtain content slot data indicative of a content slot for providing for display a content item via a user interface of the user device based on the state of the user device and the expected route.

As described herein, the navigational context further comprises a complexity of an associated stage of navigation which is determined based on expected route maneuvers. For instance, the route maneuvers can include at least one of (i) a turn, (ii) a lane change, (iii), a pedestrian crossing, (iv) a speed limit change, or (v) a straight stretch of travel. The complexity of an associated stage of navigation can be determined based on a navigational state. For instance, the navigational state can include at least one of (i) static navigational state or (ii) dynamic navigational state. A static navigation state can include a state wherein the user device is directed to continue straight for a distance above a threshold distance. The threshold distance can be based on a speed limit and a geographic area. A dynamic navigational state can include a state wherein the user device is directed to perform an expected route maneuver within a threshold distance. Example low complexity portions can include static navigation states.

Figure 4:
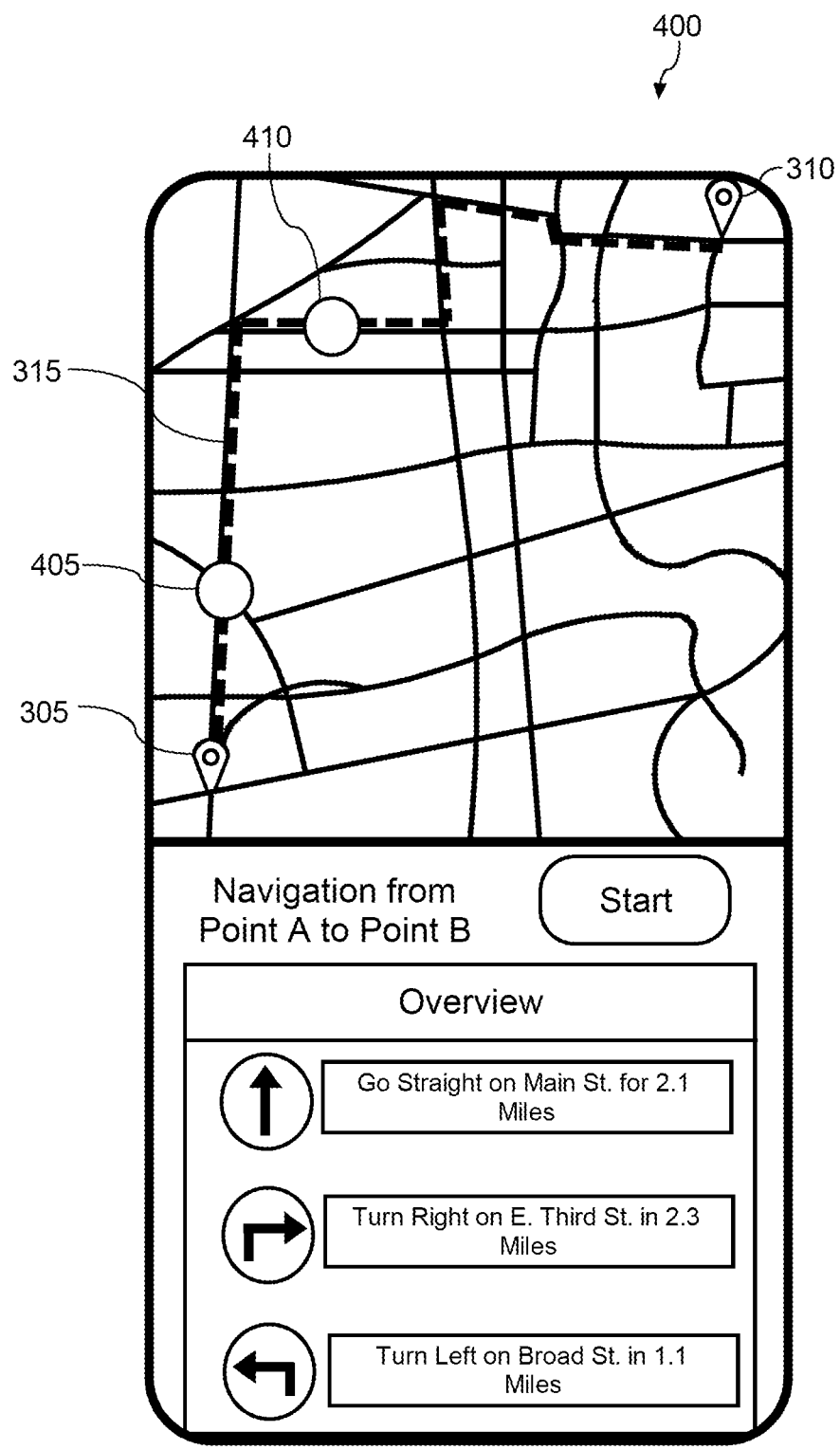
FIG. 4 depicts an example user interface according to example embodiments of the present disclosure.

FIG. 4 depicts example user interface 400 including a first candidate content slot 405 and a second candidate content slot 410. The computing system can determine one or more candidate content slots based on a complexity of the associated portion of the route. For instance, a low complexity route portion can be associated with going straight for a certain amount of mileage (e.g., 0.5 miles, 1 mile, 2 miles, 5 miles, or any other number of miles). In the present example, the computing system can determine that recommended route 315 has two portions of the route are low complexity route portions. In response, the computing system can generate as output data associated with first candidate content slot 405 and second candidate content slot 410. Data associated with first candidate content slot 405 and second candidate content slot 410 can include location data and content item data. Location data can include a location at which the content item should be provided for display to a user. Content item data can include content type (e.g., audio or visual) or content item duration.

In some implementations, the content slot for presenting the content item to the user is determined using a machine-learned model. In some implementations, the machine-learned model can be trained or updated. For instance, training the machine-model can include obtaining data indicative of user interaction with one or more content items. For instance, the system can obtain data indicative of user input comprising interaction with a content item. For instance, the computing system can obtain data indicative of a user clicking on a content item, providing audio user input, engaging with a digital assistant associated with the user device to interact with the content item, or updating navigation to a location associated with the content item. The computing system can obtain data indicative of a user performing one or more target actions. For instance target actions can include clicking on a content item or traveling to a location associated with a content item, purchasing an item associated with a content. The computing system can update the machine-learned model to select content slots that are more likely to result in target actions. For instance, the machine-learned model can be personalized to a specific user device (e.g., associated with a specific user).

At (208), method 200 can include selecting a content item for the content slot based on the navigational context. For instance, the computing system can select a content item for the content slot based on the navigational context. By way of example, navigational context can be associated with an availability window associated with a user. For instance, the computing system can determine based on the calendar application of the user device that a user has an availability window of a third time duration. Additionally or alternatively, the computing system can determine, based on the predicted traffic event that a user has an availability window of a third time duration.

The computing system can obtain data indicative of a first time duration associated with a first content item and a second time duration associated with a second content item. For instance a first content item and second content item can be associated with a same physical location or the first content item and second content item can be associated with different physical locations. The first time duration can be associated with the length of time associated with completing an action associated with the first content item. For instance, the first content item can include a recommendation to stop at a physical location for a meal, an amusement park for a day of fun, a store for retail shopping, or some other offering. The first time duration can be associated with a time to complete the activity (e.g., based on an average of time spent by other individuals, historical data associated with a user device identifier, and the like). In some implementations the first time duration and second time duration can include a travel time. Travel time can be associated with the time expected for a user device to travel from a start location to the physical location associated with the respective content item plus the time to travel from the physical location associated with the respective content item to a secondary location (e.g., end location, event location, or other location).

Figure 14:
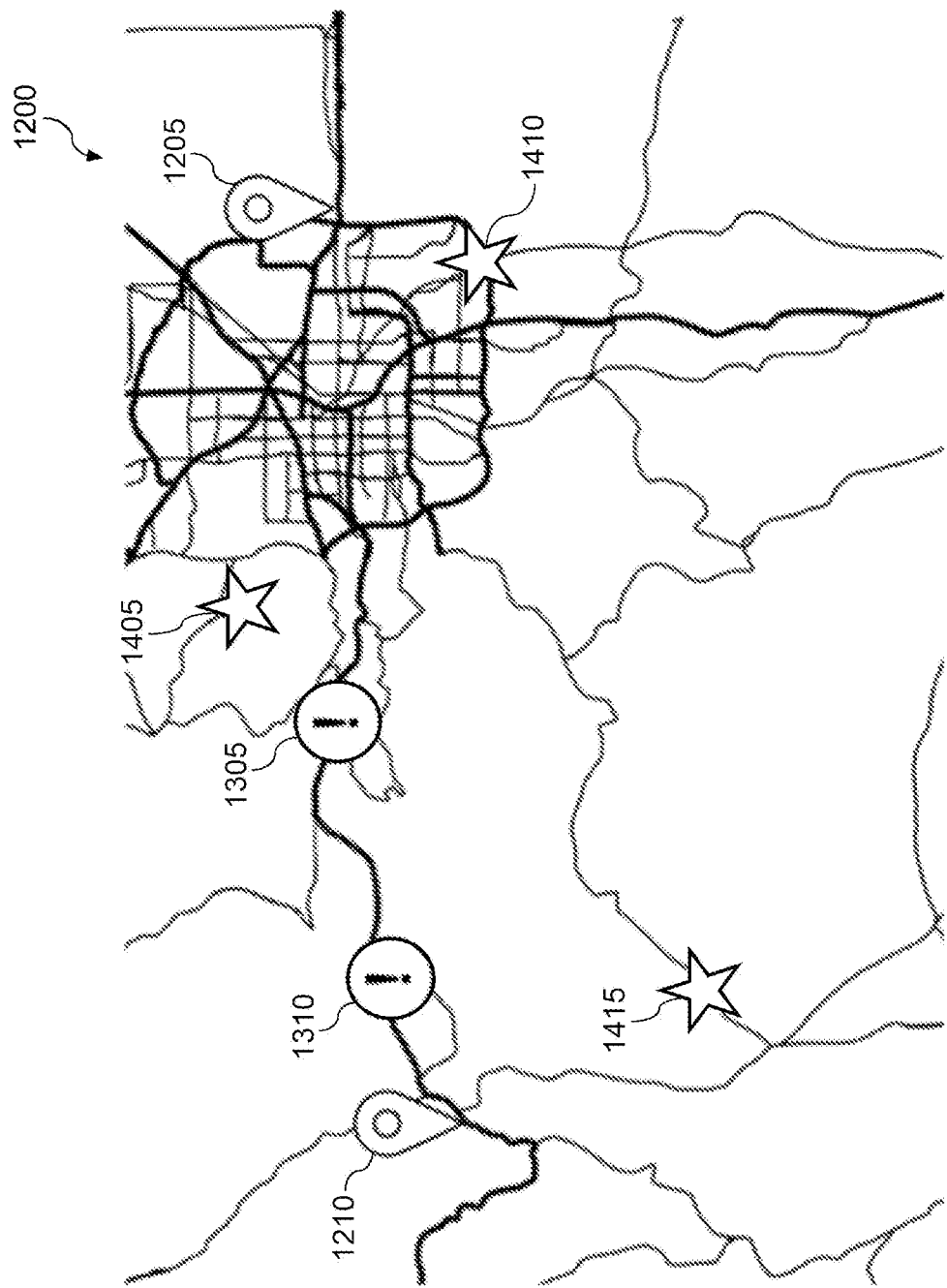
FIG. 14 depicts an example geographic area according to example embodiments of the present disclosure.

The computing system can compare the third time duration to the first time duration and the second time duration. The third time duration can be associated with a user device availability time. For instance the available time threshold can be associated with a window of time indicated as available by analyzing a calendar application (e.g., as depicted in FIG. 3-FIG. 12) or due to one or more traffic events between a user start location and an end location associated with a user navigation (e.g., as depicted in FIG. 12-FIG. 14).

The content item for the content slot can be selected based on at least one of (i) the event associated with the calendar of the application, (ii) a time to get to the location of the event, (iii) expected traffic to get to the location of the event, (iv) time to arrive at activity associated with the content item, or (v) time to complete the activity associated with the content item.

Additionally, or alternatively, content item can be selected based on a comparison of the type of content with the type of calendar event. For instance, if a user is on the way to a birthday party, the computing system can select a content item relating to places to purchase a gift, purchase balloons, purchase a cake, or purchase other birthday celebration related items. Whereas a user that is traveling to a work event can be presented with content items related to pit stops, places to grab a quick lunch, office supply store, or a place to buy suits.

For instance, the content item can be selected from a plurality of candidate content items. The plurality of candidate content items can be associated with a plurality of physical locations. For example, the physical locations can be locations associated with geographic area 600 as depicted in FIG. 6-FIG. 9.

The computing system can select the content item based on the first time duration, second time duration, and third time duration. For instance, the first time duration can be longer than the third time duration and the second time duration can be shorter than the third time duration. Based on the comparison of the respective time durations, the computing system can determine that the user can complete the activity associated with the second content item but not complete the activity associated with the first content item. Based on the determination that the user can complete the activity associated with the second content item, the content selection model can select the second content item to be provided for display via a content slot associated with the navigation instance.

By way of example, the first content item can be associated with a half day pass at an amusement park and the second content item can be associated with a buy one get one free offer for a drink at a gas station. The computing system can determine that the calendar application indicates that a user has an availability window of 30 minutes before a meeting with an estimated time of travel of 10 minutes to their work location. Based on a determination that the user can travel to the gas station, make a purchase, and get to work in 15 minutes, the computing system can select the second content item to be provided for display via an interface of the user device.

Additionally, or alternatively, the system can select a content item based on the available content slots. For instance, turning to FIG. 7, the second content item is associated with first physical location 620. The computing system can determine that the appropriate content slot is first candidate content slot 405 opposed to second candidate content slot 410. First candidate content slot 405 can be more appropriate than second candidate content slot 410 due to the rerouting required for the user to travel to first physical location 620 being less disruptive (and would take less time) than a user being rerouted and backtracking to first physical location 620 if the content item is displayed at the second content slot 415.

An additional, or alternative, example of a plurality of physical locations associated with content items is depicted in FIG. 14. By way of example, the one or more content items can be associated with the physical locations depicted in FIG. 14. FIG. 14 depicts example geographic area 1200. Geographic area 1200 can include first location 1205, second location 1210, first obstruction 1305, and second obstruction 1310. Geographic area 1200 can include first physical location 1405, second physical location 1410, and third physical location 1415. First physical location 1405, second physical location 1410, and third physical location 1415 can be associated with one or more content items or associated with one or more activities (e.g., and associated time durations).

By way of example, first physical location 1405 can be associated with a movie theater, second physical location 1410 can be associated with a fast-dining location, and third physical location 1415 can be associated with a shopping venue. An expected travel time from first location 1205 to first physical location 1405 can be 40 minutes, an expected travel time from first location 1205 to second physical location 1410 can be 10 minutes, and an expected travel time from first location 1205 to third physical location 1415 can be 1 hour 45 minutes. An expected travel time from first physical location 1405 to second location 1210 (absent obstructions) can be 1 hour. An expected travel time from second physical location 1410 to second location 1210 (absent obstructions) can be 1 hour 40 minutes. An expected travel time from third physical location 1415 to second location 1210 (absent obstructions) can be 45 minutes.

The computing system can determine that the total travel time for first physical location 1405 is 1 hour 40 minutes, the travel time for second physical location 1410 is 1 hour 50 minutes, and the travel time for third physical location 1415 is 2 hours and 30 minutes.

Each respective physical location can be associated with one or more content items that have associated time durations. For instance the associated time durations can vary based on content item. By way of example, second physical location 1410 can be associated with fast-dining. A first content item can be for a drive-thru offer and an associated time duration of 10 minutes (e.g., to grab and go) and a second content item can be an in-store offer that requires in-store dining and an associated time duration of 30-45 minutes. First physical location 1405 and third physical location 1415 can have one or more associated content items with respective time durations. For instance a content item associated with first physical location 1405 can be associated with a free movie ticket with shows ranging from 1 hour 30 minutes to 2 hours 45 minutes. Third physical location 1415 can be associated with a shopping venue and a time duration of 20 minutes to an hour.

In an instance where there are no obstructions, a content selection model can select a content item that is associated with a lowest disruption or addition of travel time to the user. For example, the content item can be the content item associated with second physical location 1410 for the grab and go option. In an instance where there are obstructions, the content selection model can select a content item that is associated with the user arriving at the second location 1210 at or before the estimated time of arrival if a user were to sit in stand-still traffic due to the obstructions. For instance, the content selection model could select a content item associated with third physical location 1415 even though additional travel time will be added by taking an alternative route from first location 1205 to second location 1210. The numbers and values used in the example above are used for illustrative purposes only and are not meant to be limiting to the present disclosure.

Content selection component can incorporate additional or alternative considerations in selecting content. For instance, content selection component can include participation in a real-time content selection process (e.g., proposals for resource allocation, bids, etc.). Content selection can include selecting one or more digital components or content items. Content items can include, for example input elements, digital components, and the like. For instance, content items can be provided by entities and can be related to a particular topic, object, product, or service.

The content item can be selected using a machine-learned model. For instance, the computing system can obtain data indicative of user interaction with one or more content items, The computing system can obtain data indicative of a user performing one or more target actions. The computing system can update the machine learned model based on the data indicative of the user interaction with the one or more content items and the data indicative of the user performing one or more target actions.

At (210), method 200 can include transmitting data comprising instructions that when executed by the user device cause a content item to be provided for display via the content slot. For instance, the computing system can transmit data comprising instructions that when executed by the user device cause a content item to be provided for display via the content slot.

Figure 10:
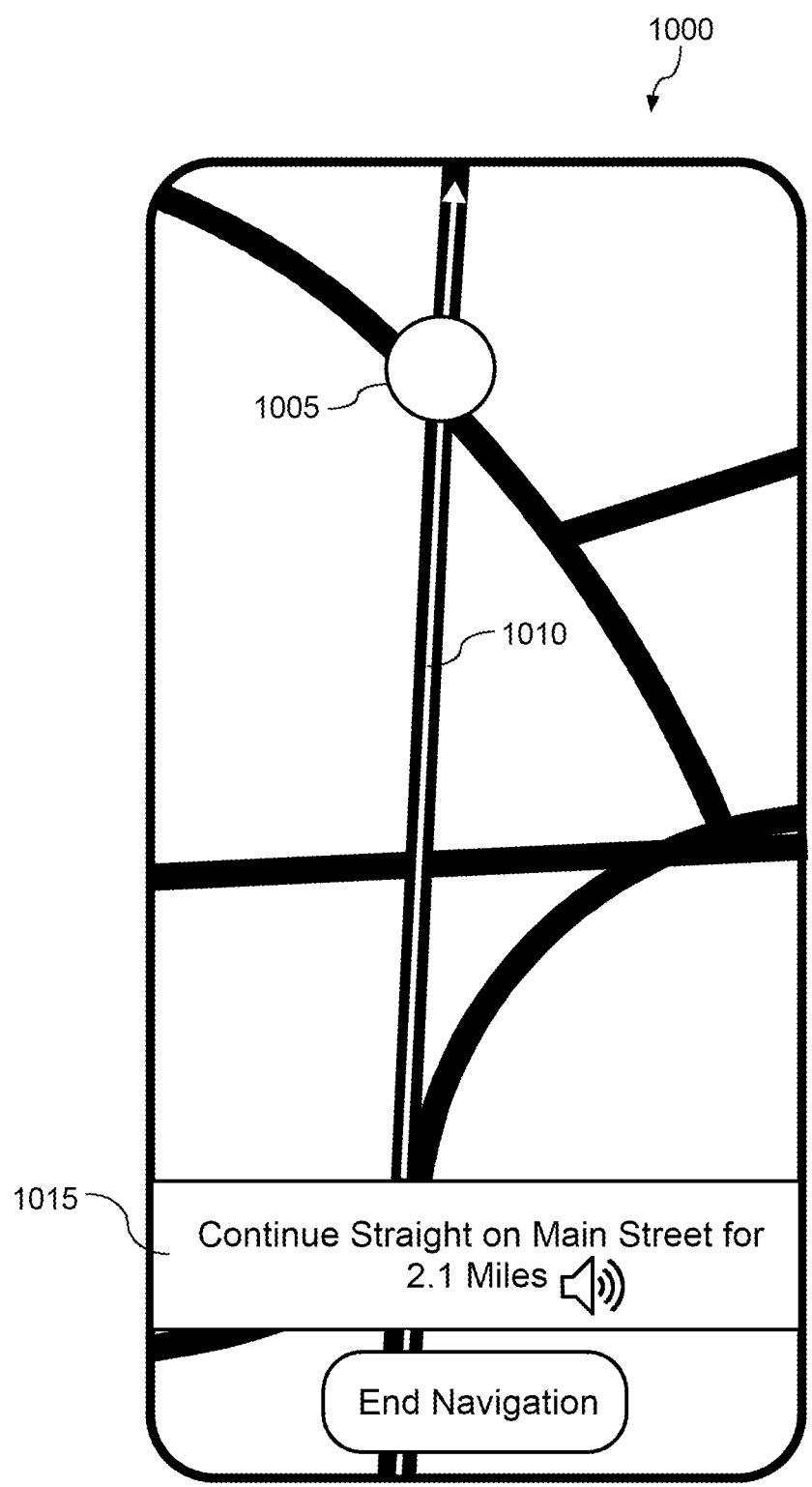
FIG. 10 depicts an example user interface according to example embodiments of the present disclosure.

FIG. 10 depicts example user interface 1000. User interface 1000 can be an interface associated with a user actively utilizing a navigation feature of an application. For instance, the computing system can obtain data indicative of a user selecting a "Start Navigation" button. In response, the computing system can launch a navigation instance. The navigation instance can include a content slot 1005, a recommended route 1010, or notification window 1015. Content slot 1005 can be invisible to a user until the computing system obtains data indicative of the user location that triggers presentation of one or more content items via an interface of the user device. The recommended route 1010 can be associated with an overall recommended route. Recommended route 1010 can be updated based on the computing system obtaining data of the user device's location being "off-route" (e.g., can provide a re-routing).

In some implementations, notification window 1015 can include one or more notifications. In some implementations notification window 1015 can be invisible and can include one or more audio notifications being provided for display via an interface of the user device (e.g., speaker).

Figure 11A:
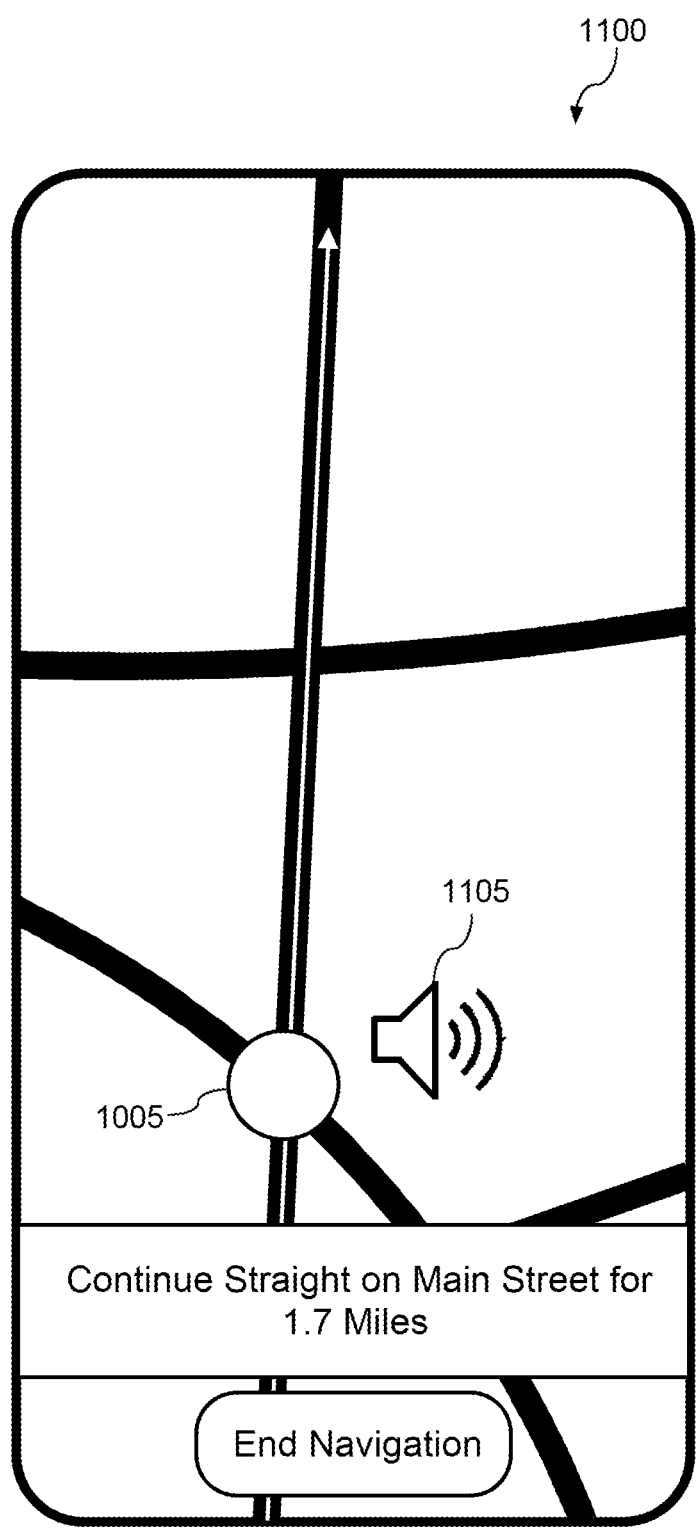
FIG. 11A-FIG. 11B depict example user interfaces according to example embodiments of the present disclosure.
Figure 11B:
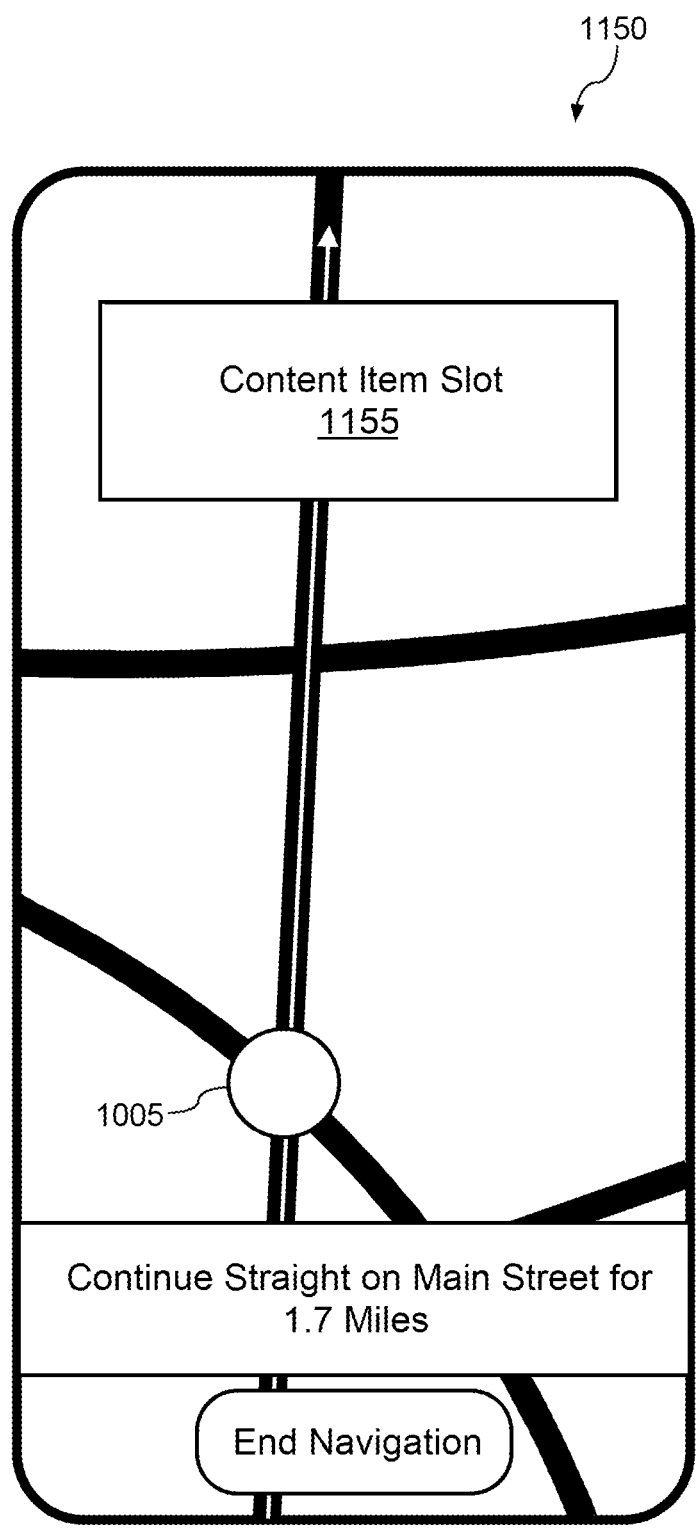

FIG. 11A and FIG. 11B depict example implementations of providing content items for display via an interface of the user device. FIG. 11A depicts an example of an audio content item 1105 being provided for display via an example user interface 1100 of user device. For instance user interface 1100 can include a content slot 1005. The computing system can determine that a location associated with the user device is within content slot 1005. In response, the computing system can provide for display content item 1105. For instance, content item 1105 can be an audio content item.

FIG. 11B depicts an example of a visual content item 1155 being provided for display via an example user interface 1150 of user device. For instance user interface 1100 can include a content slot 1005. The computing system can determine that a location associated with the user device is within content slot 1005. In response, the computing system can provide for display content item 1155. For instance, content item 1155 can be a visual content item. Visual content item can include an image, video, graphic, or other visual content item.

FIG. 15 depicts example database(s) 1500 that can store data utilized by one or more computing systems described herein. For instance, data can be stored in one or more databases 1500. By way of example, data can include user device state data 1510, expected route data 1535, calendar event data 1540, traffic event data 1545, or content item data 1570. In some implementations database(s) 1500 are first party database(s), third party database(s), or a combination of third party database(s) and first party database(s).

User device state data 1510 can include current location data, past location data, second location data, passenger data, vehicle operator data, or other user device state related data. Expected route data 1535 can include start location data, end location data, estimated time of travel data, estimated time of arrival data, traffic data, or other expected route related data. Calendar event data 1540 can include title data, description data, location data, start time data, duration data, type data, or other calendar event related data. Traffic event data 1545 can include recommended route data, obstructions data, obstructions duration data, alternative routes data, traffic data, or other traffic event related data. Content item data 1570 can include data associated with a plurality of content items. For instance, each content item can include content item identifier data, physical location data, and time duration data. Content item identifier data can be used to identify a respective content item. Physical location data can include data associated with a geographic location associated with the content item. For instance, a geographic location can be associated with a brick-and-mortar location, a street address, latitude and longitude coordinates, GPS coordinates, or any other location data.

Time duration data can include a time duration associated with the content item. For instance, a content item can include a coupon for an amusement park, an image of food item available at a location, or some other content that has an associated time with completing the activity associated with the content item. For example, the time to completion can include the time to ride a certain number of rides at an amusement park, the time to visit a restaurant and order or consume a food item, or some other expected time duration for completion. In some implementations the expected time duration for completion can include the time it would take for a user to travel from a start location to the physical location and then the physical location to a second location. A second location can include, for example, an end location associated with a navigation instance, an expected end location based on context data, or a location associated with an upcoming calendar event.

Figure 16A:
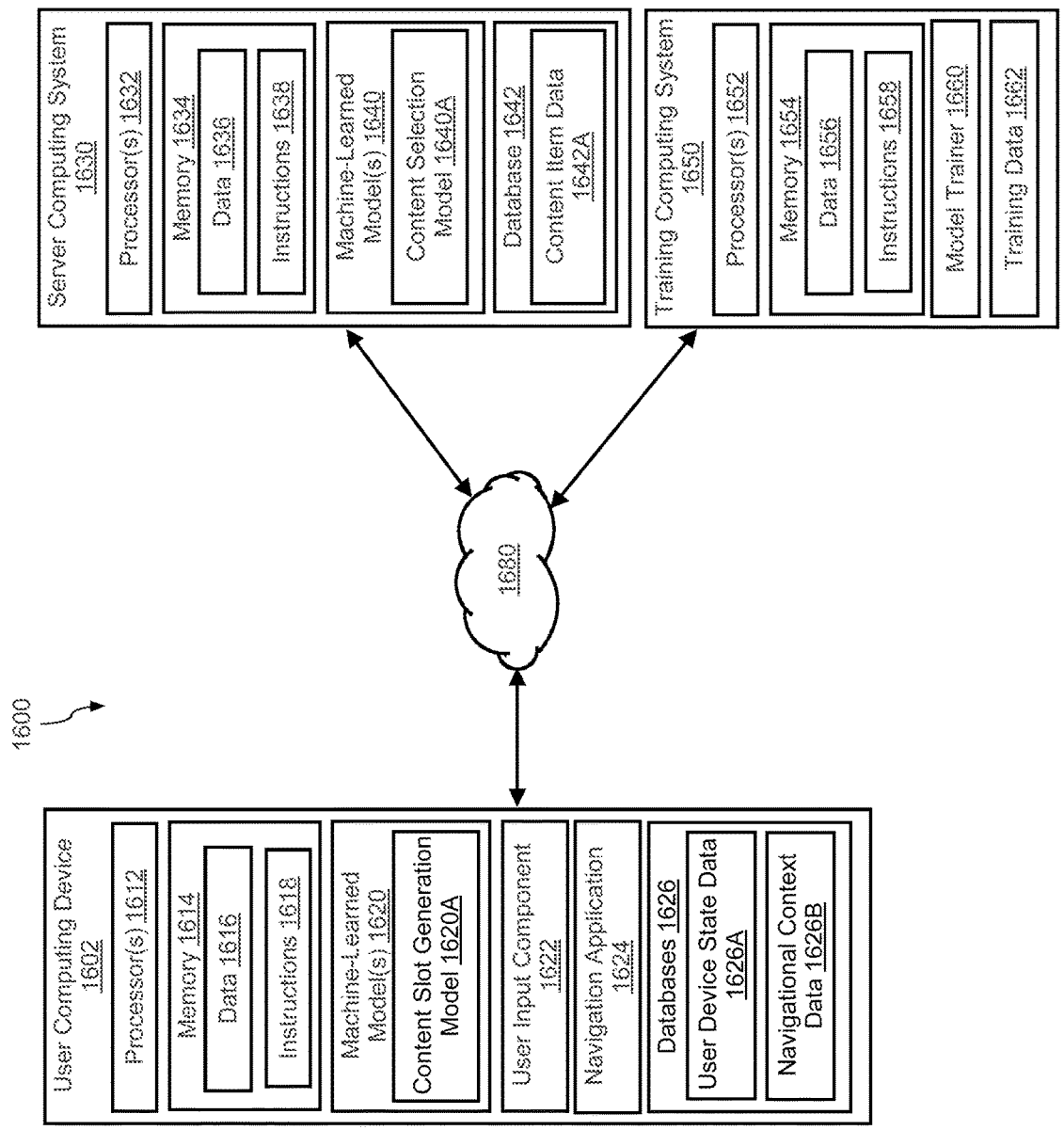
FIG. 16A depicts a block diagram of an example computing system that performs integration of content within the navigation interface based on contextual data according to example embodiments of the present disclosure.

FIG. 16A depicts a block diagram of an example computing system 1600 that performs integration of content within navigation interface based on contextual data according to example embodiments of the present disclosure. The computing system 1600 includes a user computing device 1602, a server computing system 1630, and a training computing system 1650 that are communicatively coupled over a network 1680.

The user computing device 1602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 1602 includes one or more processors 1612 and a memory 1614. The one or more processors 1612 can be any suitable processing device (e.g., a processor core, a microprocessor, an ASIC, an FPGA, a controller, a microcontroller, etc.) and can be one processor or a plurality of processors that are operatively connected. The memory 1614 can include one or more non-transitory computer-readable storage media, such as RAM, ROM, EEPROM, EPROM, flash memory devices, magnetic disks, etc., and combinations thereof. The memory 1614 can store data 1616 and instructions 1618 which are executed by the processor 1612 to cause the user computing device 1602 to perform operations.

In some implementations, the user computing device 1602 can store or include one or more models 1620. For example, the models 1620 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example models 1620 are discussed with reference to FIG. 1 and FIG. 2.

In some implementations, the one or more content slot generation models 1620A can be received from the server computing system 1630 over network 1680, stored in the user computing device memory 1614, and then used or otherwise implemented by the one or more processors 1612. In some implementations, the user computing device 1602 can implement multiple parallel instances of a single content slot generation model 1620A.

More particularly, models 1620 can include content slot generation models or content selection models. For instance, models can be utilized to determine the placement of a content item slot or selection of one or more content items to be provided for display (e.g., to a user based on navigational or contextual data).

Additionally or alternatively, one or more machine-learned models 1640 can be included in or otherwise stored and implemented by the server computing system 1630 that communicates with the user computing device 1602 according to a client-server relationship. For example, the machine-learned models 1640 can be implemented by the server computing system 1630 as a portion of a web service (e.g., a content management service, content selection service, content generation service). Thus, one or more models 1620 can be stored and implemented at the user computing device 1602 or one or more models 1640 can be stored and implemented at the server computing system 1630. For instance, models 1640 can include content selection model 1640A.

The user computing device 1602 can also include one or more user input components 1622 that receives user input. For example, the user input component 1622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 1602 can also include one or more navigation components. For example, navigation components can include navigation application 1624.

The user computing device 1602 can include database 1626. Database 1626 can include user device state data 1626A or navigational context data 1626B.

The server computing system 1630 includes one or more processors 1632 and a memory 1634. The one or more processors 1632 can be any suitable processing device (e.g., a processor core, a microprocessor, an ASIC, an FPGA, a controller, a microcontroller, etc.) and can be one processor or a plurality of processors that are operatively connected. The memory 1634 can include one or more non-transitory computer-readable storage media, such as RAM, ROM, EEPROM, EPROM, flash memory devices, magnetic disks, etc., and combinations thereof. The memory 1634 can store data 1636 and instructions 1638 which are executed by the processor 1632 to cause the server computing system 1630 to perform operations.

In some implementations, the server computing system 1630 includes or is otherwise implemented by one or more server computing devices. In instances in which the server computing system 1630 includes plural server computing devices, such server computing devices can operate according to sequential computing architectures, parallel computing architectures, or some combination thereof.

As described above, the server computing system 1630 can store or otherwise include one or more models 1640. For example, the models 1640 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Models 1640 can include content selection model 1640A. content selection model 1640A can be configured to select one or more content items to be provided for display (e.g., via a content slot generated by content slot generation model 1620A). Example models 1640 are discussed with reference to FIG. 1 and FIG. 2.

Server computing system 1630 can include database 1642. Database 1642 can store content item data 1642A.

The user computing device 1602 or the server computing system 1630 can train the models 1620 or 1640 via interaction with the training computing system 1650 that is communicatively coupled over the network 1680. The training computing system 1650 can be separate from the server computing system 1630 or can be a portion of the server computing system 1630.

The training computing system 1650 includes one or more processors 1652 and a memory 1654. The one or more processors 1652 can be any suitable processing device (e.g., a processor core, a microprocessor, an ASIC, an FPGA, a controller, a microcontroller, etc.) and can be one processor or a plurality of processors that are operatively connected. The memory 1654 can include one or more non-transitory computer-readable storage media, such as RAM, ROM, EEPROM, EPROM, flash memory devices, magnetic disks, etc., and combinations thereof. The memory 1654 can store data 1656 and instructions 1658 which are executed by the processor 1652 to cause the training computing system 1650 to perform operations. In some implementations, the training computing system 1650 includes or is otherwise implemented by one or more server computing devices.

The training computing system 1650 can include a model trainer 1660 that trains the machine-learned models 1620 or 1640 stored at the user computing device 1602 or the server computing system 1630 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, or various other loss functions. Gradient descent techniques can be used to iteratively update the parameters over a number of training iterations.

In some implementations, performing backwards propagation of errors can include performing truncated backpropagation through time. The model trainer 1660 can perform a number of generalization techniques (e.g., weight decays, dropouts, etc.) to improve the generalization capability of the models being trained.

In particular, the model trainer 1660 can train the models 1620 or 1640 based on a set of training data 1662. The training data 1662 can include, for example, training data can include user input data, conversion data, user device location data, click data, or other data indicative of a content item being displayed via a user device and the user device performing a target action (e.g., visiting a physical location associated with the respective content item).

In some implementations, if the user has provided consent, the training examples can be provided by the user computing device 1602. Thus, in such implementations, the model 1620 provided to the user computing device 1602 can be trained by the training computing system 1650 on user-specific data received from the user computing device 1602. In some instances, this process can be referred to as personalizing the model.

The model trainer 1660 includes computer logic utilized to provide desired functionality. The model trainer 1660 can be implemented in hardware, firmware, or software controlling a general purpose processor. For example, in some implementations, the model trainer 1660 includes program files stored on a storage device, loaded into a memory and executed by one or more processors. In other implementations, the model trainer 1660 includes one or more sets of computer-executable instructions that are stored in a tangible computer-readable storage medium such as RAM, hard disk, or optical or magnetic media.

The network 1680 can be any type of communications network, such as a local area network (e.g., intranet), wide area network (e.g., Internet), or some combination thereof and can include any number of wired or wireless links. In general, communication over the network 1680 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The machine-learned models described in this specification may be used in a variety of tasks, applications, or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable or efficient transmission or storage (or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 16A illustrates one example computing system that can be used to implement the present disclosure. Other computing systems can be used as well. For example, in some implementations, the user computing device 1602 can include the model trainer 1660 and the training data 1662. In such implementations, the models 1620 can be both trained and used locally at the user computing device 1602. In some of such implementations, the user computing device 1602 can implement the model trainer 1660 to personalize the models 1620 based on user-specific data.

Figure 16B:
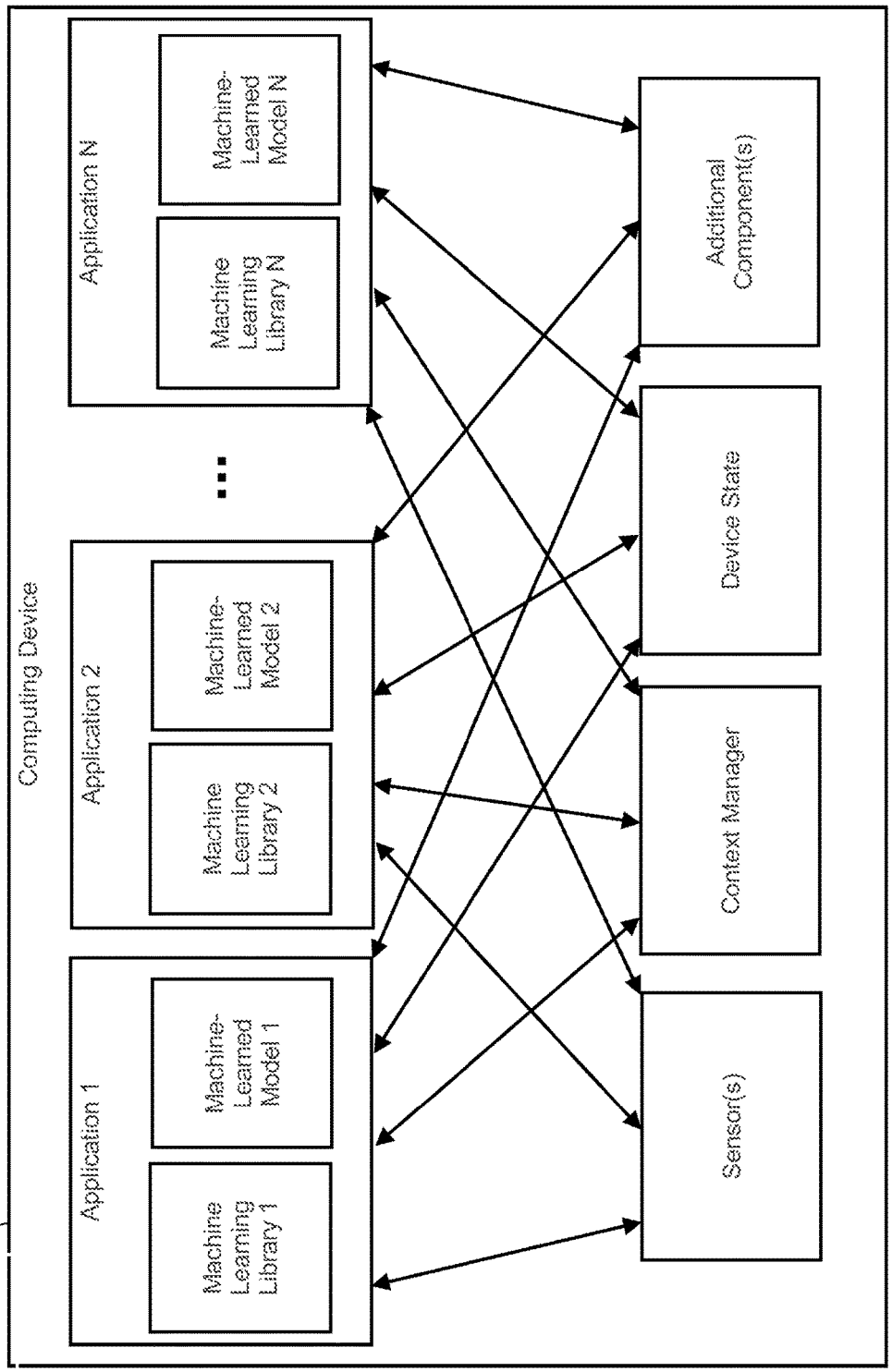
FIG. 16B depicts a block diagram of an example computing device that performs integration of content within the navigation interface based on contextual data according to example embodiments of the present disclosure.

FIG. 16B depicts a block diagram of an example computing device 50 that performs according to example embodiments of the present disclosure. The computing device 50 can be a user computing device or a server computing device.

The computing device 50 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 16B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 16C:
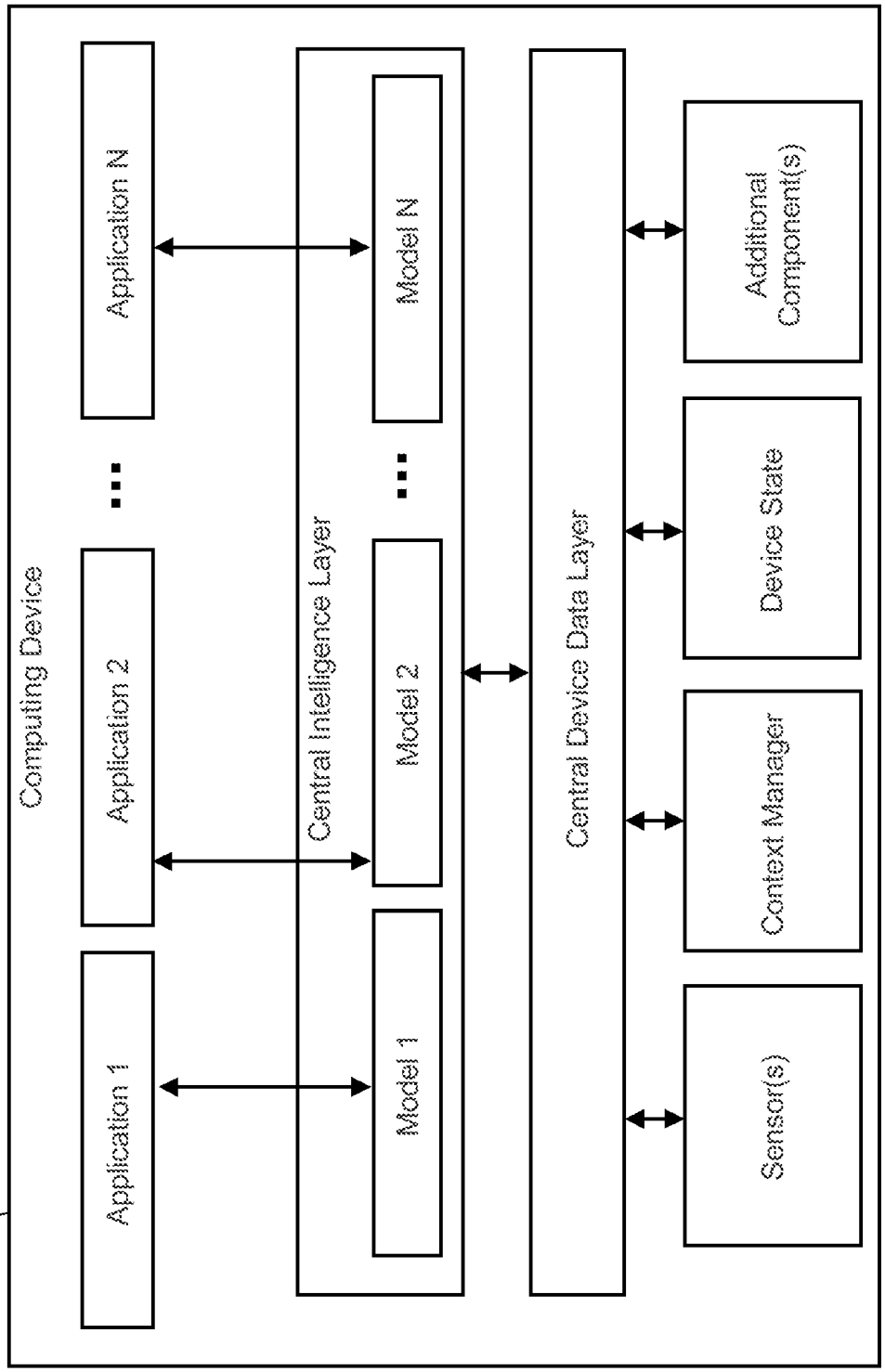
FIG. 16C depicts a block diagram of an example computing device that performs integration of content within the navigation interface based on contextual data according to example embodiments of the present disclosure.

FIG. 16C depicts a block diagram of an example computing device 55 that performs according to example embodiments of the present disclosure. The computing device 55 can be a user computing device or a server computing device.

The computing device 55 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 16C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 55.

The central intelligence layer can communicate with a central device data layer. The central device data layer can be a centralized repository of data for the computing device 55. As illustrated in FIG. 16C, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computer-implemented method, comprising:
   obtaining, by a computing system, data associated with a state of a user device, wherein the state of the user device comprises at least one of (i) a location of a user device or (ii) a transit type;
   obtaining, by the computing system, data associated with navigational context associated with a user device, wherein the navigational context comprises an expected route and at least one of (i) an event associated with a calendar application of a user device or (ii) a predicted traffic event;
   obtaining, by the computing system, content slot data indicative of a content slot for providing for display a content item to via a user interface of the user device based on the state of the user device and the expected route;
   obtaining data indicative of a first time duration associated with a first content item and a second time duration associated with a second content item;
   determining, based on the calendar application of the user device that a user has an availability window of a third time duration;
   comparing the third time duration to the first time duration and the second time duration;
   selecting, by the computing system, a content item for the content slot based on the navigational context, the first time duration, the second time duration, and the third time duration; and
   transmitting, by the computing system, data comprising instructions that when executed by the user device cause a content item to be provided for display via the content slot.

2. The computer-implemented method of claim 1, wherein the location of the user device comprises a current location of the user device.

3. The computer-implemented method of claim 1, wherein the transit type comprises at least one of (i) passenger or (ii) operator.

4. The computer-implemented method of claim 3, wherein the transit type of the user device is determined based on at least one of (i) determining the user is traveling along a public transit route or (ii) obtaining user input indicative of the transit type.

5. The computer-implemented method of claim 1, wherein the expected route comprises at least one of (i) a route recommended by a navigation application, (ii) a frequently traveled route associated with transit of the user device between two locations, (iii) a recommended route that aligns with one or more user preferences, or (iv) a route that aligns with a public transit route.

6. The computer-implemented method of claim 1, wherein the navigational context further comprises a complexity of an associated stage of navigation which is determined based on expected route maneuvers.

7. The computer-implemented method of claim 6, wherein the expected route maneuvers comprise at least one of (i) a turn, (ii) a lane change, (iii), a pedestrian crossing, (iv) a speed limit change, or (v) a straight stretch of travel.

8. The computer-implemented method of claim 6, wherein the complexity of an associated stage of navigation is determined based on a navigational state, wherein the navigational state comprises at least one of (i) static navigational state or (ii) dynamic navigational state.

9. The computer-implemented method of claim 8, wherein the static navigational state comprises a state wherein the user device is directed to continue straight for a distance above a threshold distance, wherein the threshold distance is based on a speed limit and a geographic area.

10. The computer-implemented method of claim 8, wherein the dynamic navigational state comprises a state wherein the user device is directed to perform an expected route maneuver within a threshold distance.

11. A computing system, comprising:
one or more processors; and
one or more one or more non-transitory computer-readable media storing instructions that are executable to cause the one or more processors to perform operations, the operations comprising:
obtaining, by the computing system, data associated with a state of a user device, wherein the state of the user device comprises at least one of (i) a location of a user device or (ii) a transit type;
obtaining, by the computing system, data associated with navigational context associated with a user device, wherein the navigational context comprises an expected route and at least one of (i) an event associated with a calendar application of a user device or (ii) a predicted traffic event;
obtaining, by the computing system, content slot data indicative of a content slot for providing for display a content item to via a user interface of the user device based on the state of the user device and the expected route;
obtaining data indicative of a first time duration associated with a first content item and a second time duration associated with a second content item;
determining, based on the predicted traffic event that a user has an availability window of a third time duration;
comparing the third time duration to the first time duration and the second time duration;
selecting, by the computing system, a content item for the content slot based on the navigational context, the first time duration, the second time duration, and the third time duration; and
transmitting, by the computing system, data comprising instructions that when executed by the user device cause a content item to be provided for display via the content slot.

12. The computing system of claim 11, wherein the predicted traffic event comprises at least one of (i) occurrence of a car accident, (ii) an indication of traffic movement below a threshold speed, (iii) an expected time to resolve a traffic instance, or (iv) an expected increase in traffic.

13. The computing system of claim 11, wherein the event associated with the calendar application of the user device comprises at least one of (i) an event start time, (ii) an event location, or (iii) an event description.

14. The computing system of claim 13, wherein the content item for the content slot is selected based on at least one of (i) the event associated with the calendar of the application, (ii) a time to get to the location of the event, (iii) expected traffic to get to the location of the event, (iv) time to arrive at activity associated with the content item, or (v) time to complete the activity associated with the content item.

15. The computing system of claim 11, wherein the content slot for presenting the content item to the user is determined using a machine-learned model.

16. The computing system of claim 15, the operations comprising:
obtaining data indicative of user interaction with one or more content items;
obtaining data indicative of a user performing one or more target actions; and
updating the machine-learned model based on the data indicative of the user interaction with the one or more content items and the data indicative of the user performing one or more target actions.

17. The computing system of claim 11, wherein the selected content item comprises an audio content item.

18. One or more non-transitory computer readable media storing instructions that are executable by one or more processors to perform operations comprising:
obtaining, by a computing system, data associated with a state of a user device, wherein the state of the user device comprises at least one of (i) a location of a user device or (ii) a transit type;
obtaining, by the computing system, data associated with navigational context associated with a user device, wherein the navigational context comprises an expected route and at least one of (i) an event associated with a calendar application of a user device or (ii) a predicted traffic event;
obtaining, by the computing system, content slot data indicative of a content slot for providing for display a content item to via a user interface of the user device based on the state of the user device and the expected route;
obtaining data indicative of a first time duration associated with a first content item and a second time duration associated with a second content item;
determining, based on the calendar application of the user device that a user has an availability window of a third time duration;
comparing the third time duration to the first time duration and the second time duration;
selecting, by the computing system, a content item for the content slot based on the navigational context, the first time duration, the second time duration, and the third time duration; and
transmitting, by the computing system, data comprising instructions that when executed by the user device cause a content item to be provided for display via the content slot.

* * * * *